United States Patent
Chang et al.

(10) Patent No.: US 9,915,534 B2
(45) Date of Patent: Mar. 13, 2018

(54) METHOD AND APPARATUS FOR IMPROVED NAVIGATION FOR CYCLING

(71) Applicant: Trusted Positioning, Inc., Calgary (CA)

(72) Inventors: Hsiu-Wen Chang, Calgary (CA); Jacques Georgy, Calgary (CA); Naser El-Sheimy, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 14/762,136

(22) PCT Filed: Jan. 23, 2014

(86) PCT No.: PCT/CA2014/000046
§ 371 (c)(1),
(2) Date: Jul. 20, 2015

(87) PCT Pub. No.: WO2014/113874
PCT Pub. Date: Jul. 31, 2014

(65) Prior Publication Data
US 2015/0345952 A1      Dec. 3, 2015

Related U.S. Application Data

(60) Provisional application No. 61/755,857, filed on Jan. 23, 2013.

(51) Int. Cl.
*G01C 21/12* (2006.01)
*G01C 22/00* (2006.01)

(52) U.S. Cl.
CPC .......... *G01C 21/12* (2013.01); *G01C 22/002* (2013.01)

(58) Field of Classification Search
USPC ........................................................ 701/541
See application file for complete search history.

(56) References Cited

U.S. PATENT DOCUMENTS

| 8,121,785 B2 * | 2/2012 | Swisher ............ A63B 24/0062 |
| | | 701/423 |
| 2012/0083705 A1 * | 4/2012 | Yuen .................... A61B 5/0002 |
| | | 600/508 |
| 2012/0239248 A1 * | 9/2012 | Bobbitt .................... G08G 1/20 |
| | | 701/36 |

* cited by examiner

*Primary Examiner* — Shelley Chen
(74) *Attorney, Agent, or Firm* — Bay Area Technology Law Group PC

(57) ABSTRACT

A method and apparatus for providing an enhanced navigation solution for cycling applications is described herein. The navigation solution is about a device within a platform, which is a cycling platform such as for example a bicycle, a tricycle, or a unicycle amongst others. The device can be in any orientation with respect to the platform (such as for example in any location or orientation on the body of the cyclist). The device includes a sensor assembly. The sensors in the device may be for example, accelerometers, gyroscopes, magnetometers, barometer among others. The present method and apparatus can work whether in the presence or in the absence of navigational information updates (such as, for example, Global Navigation Satellite System (GNSS) or WiFi positioning).

20 Claims, 38 Drawing Sheets

(a) Device frame (b) Platform frame (v), device frame (b), navigation frame (n), and transformation matrices between frames.

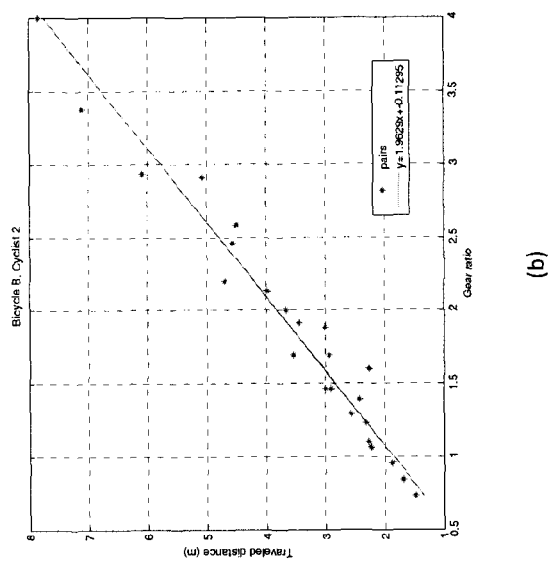
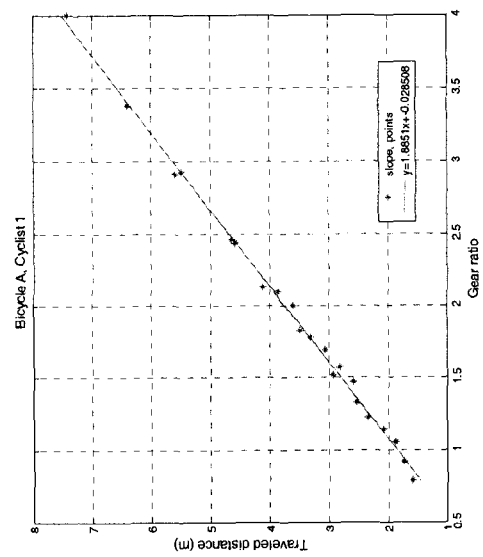
Figure 19

METHOD AND APPARATUS FOR IMPROVED NAVIGATION FOR CYCLING

RELATED APPLICATIONS

This application claims the benefit of U.S. Provisional Patent Application No. 61/755,857, filed Jan. 23, 2013 which is hereby incorporated by reference.

TECHNICAL FIELD

The present disclosure relates to navigation systems and methods and more particularly to navigation systems and methods of navigation solutions for cycling platforms.

BACKGROUND

Inertial navigation of a platform is based upon the integration of specific forces and angular rates measured by inertial sensors (e.g. accelerometer, gyroscopes) by a device containing the sensors. In general, the device is positioned within the platform and commonly tethered to the platform. Such measurements from the device may be used to determine the position, velocity and attitude of the device and/or the platform.

The platform may be a motion-capable platform that may be temporarily stationary. Some of the examples of the platforms may be a person, a vehicle or a vessel of any type. In the present disclosure the platform is a cycling platform as defined below.

Nowadays, Micro-Electro-Mechanical System (MEMS) based inertial sensors have the advantages of low cost, low power consumption, low weight and small size. Based on these characteristics, the MEMS-inertial sensors can be integrated with other motion sensors (such as barometer, magnetometer) in small devices such as watches, goggles, shoes, belts, smart phones, or custom built devices, etc. Inertial sensors are self-contained systems that are not dependent on the transmission of signals or reception from an external source, thereby minimizing problems like signal blockage, jamming and multipath caused by various environments. When used in navigation, inertial sensors provide high data rate acceleration and angular rate measurements. In addition to navigation, low-cost MEMS sensors are also used in sports to aid sports training. By the advantage of small size, low power consumption and affordable prices, MEMS inertial sensors make it possible to obtain biomechanical, physical or cognitive information from monitoring the user's performance during sport practices. However, the main draw-back of MEMS-based inertial sensors in all the aforementioned applications is that performance of traditional navigation solutions relying on these sensors can deteriorate over time. Therefore, it is important to employ independent measurements as updated measurements for decreasing accumulated errors because these MEMS-based sensors have very low quality performance for navigation purposes due to the sensors' large errors. Therefore, MEMS inertial sensors cannot work alone for long term navigation uses and require assistance from other sensors (such as for example magnetometer and barometer) as well as aid from other reference based systems that can provide absolute navigational information.

One such source of absolute navigation information is the Global Navigation Satellite System (GNSS), which is a positioning system that calculates a user's position and velocity by means of trilateration techniques. In other words, GNSS estimates the user position by knowing the satellites' current location and corresponding distances to the object. When in open sky, GNSS can provide relatively accurate performance in position and velocity. However, it has several disadvantages that limit its implementation in the environments that do not have clear line of sight and can suffer from signal degradation or complete blockage.

In order to solve the problem mentioned above, GNSS has been integrated with Inertial Navigation System (INS). GNSS/INS integration system have been widely used in various applications. However, when GNSS is degraded or blocked, MEMS-based sensors have to work alone and the traditional positioning solution will degrade in a short duration. The system errors in MEMS-based accelerometer and gyroscope grow quickly with the mathematical integration operations and result in an accumulation of errors.

In addition to the above discussed problems that are common for all commercial INS/GNSS applications and that need particular procedures for each type of application, there are additional problems which may affect the application at hand. Generally speaking, alignment of the inertial sensors within the platform (and with the platform's forward, transversal and vertical axis) is critical for inertial navigation. If the inertial sensors, such as accelerometers and gyroscopes are not exactly aligned with the platform, the positions and attitude calculated using the readings of the inertial sensors will not be representative of the platform. Fixing the inertial sensors within the platform is thus a traditional requirement for navigation systems that provide high accuracy navigation solutions.

For tethered systems, one known means for ensuring optimal navigation solutions is to utilize careful manual mounting of the inertial sensors within the platform. However, portable navigation devices (or navigation-capable devices) are able to move whether constrained or unconstrained within the platform (such as for example on the body of the person cycling), so careful mounting on the platform is very difficult.

As such, there is a need for a method and apparatus for cycling applications to provide an enhanced navigation solution capable of accurately utilizing measurements from a device to determine the navigation state of the device/platform while decreasing the effect of the above mentioned problems, without any constraints on the environments where cycling happens (i.e. in outdoor, indoor, in urban canyons, or tunnels, among other environments), and also without implying harsh constraints on the device. The estimation of the position and attitude of the platform has to be independent of the location of the device (such as, for example, the device can be on back, chest, leg, arm, thigh, belt, or pocket of the person cycling).

In addition to applications that include a full navigation solution including position, velocity and attitude, or position and attitude, there are other applications that may include estimating an attitude only solution, an attitude and velocity solution, or the distance traveled solution whether alone or combined with any other estimated quantity. In all these applications, there is a need for a method and apparatus to enhance the determination of such quantities for enhancing the user experience, usability, coaching, and performance analysis for cycling applications.

SUMMARY

The present disclosure relates to a method and apparatus for providing an enhanced navigation solution for cycling applications. The navigation solution is for a device within a cycling platform, such as for example a bicycle or a tricycle. The device can be in any orientation with respect to the platform (such as for example in any location or orientation on the body of the cyclist). The device includes a sensor assembly. The sensors in the device may be for example, accelerometers, gyroscopes, magnetometers, barometer amongst others. The sensors have a corresponding frame for the sensors' axes. The present method and apparatus may be used whether in the presence or in the absence of navigational information updates (such as, for example, GNSS or WiFi positioning).

In some embodiments, the present method and apparatus may include one device and can provide improvement for the navigation solution using this device. In other embodiments, the present method and apparatus may include more than one device at different locations on the cyclist body to further improve the navigation solution, moreover detecting more human motion can help improve further the system performance. In the case with more than one device, the information may be transmitted between the devices (whether wirelessly or in a wired manner), synchronized, and shared with each other.

In one embodiment, in order to improve the cycling navigation performance the present method and apparatus uses detection of pedal cycles and uses this information to derive the speed and/or the traveled distance per cycle and/or the traveled distance of the platform.

In another embodiment, in order to improve the cycling navigation performance the derived speed and/or traveled distance per cycle of the platform may be used to obtain a Cycling Dead Reckoning (CDR) solution. This solution may be used as is or used to further enhance the navigation performance of another navigation solution.

In another embodiment, in order to improve the cycling navigation performance the present method and apparatus uses a routine to determine the heading misalignment angle between the device and the platform.

In another embodiment, in order to improve the cycling navigation performance the present method and apparatus uses the determined heading misalignment angle between the device and the platform together with the heading of the device to calculate the heading of the platform and use it for CDR.

In another embodiment, in order to improve the cycling navigation performance the present method and apparatus uses the determined heading misalignment angle between the device and the platform to enhance the navigation solution by applying motion constraints on the solution.

In another embodiment, in order to improve the cycling navigation performance the present method and apparatus uses a routine to determine the roll and pitch misalignment angles between the device frame (the frame of sensors of the device) and the platform frame.

In another embodiment, in order to improve the cycling navigation performance the present method and apparatus uses the determined heading, roll, and pitch misalignment angles between the device and the platform to enhance the navigation solution by applying motion constraints on the solution.

In some embodiments, the present method and apparatus may be used with single-gear bicycles. In some other embodiments, the present method and apparatus may be used with multi-gear bicycles. In yet some other embodiments, the present method and apparatus may work with other cycling platforms.

The present method and apparatus can work with different device usages and orientations with respect to the cyclist. In all device usages and orientations, the present method and apparatus can work with any roll, pitch, and azimuth (heading) angles of the device. It can also work with any type of bicycle, regardless of the various tire sizes, various gears, and regardless of the cyclist.

Any one or any combination of the above embodiments can be used whether in real-time solution or in post-mission offline solution.

A method for providing an enhanced navigation solution related to at least one device and a cycling platform that moves through pedal cycles is provided, wherein the at least one device is positionable in any orientation with respect to the platform, and the device is locatable at any location on the cycling platform or on a body of a cyclist of the cycling platform, and wherein the at least one device includes sensors capable of providing sensor readings, the method comprising detecting the pedaling cycles using the sensor readings.

A method for providing an enhanced navigation solution related to at least one device and a cycling platform that moves through pedal cycles is provided, wherein the at least one device is positionable in any orientation with respect to the platform and the device is locatable at any location on the cycling platform or on a body of a cyclist of the cycling platform, and wherein the at least one device comprises sensors capable of providing sensor readings, the method including: a) detecting the pedaling cycles using the sensor readings and obtaining models for speed of the platform, traversed distance of the platform, or both the speed of the platform and the traversed distance of the platform; and b) detecting the pedaling cycles using the sensor readings and applying the obtained models together with the platform heading to obtain a cycling dead reckoning solution comprising position of the platform, velocity of the platform, or both position and velocity of the platform.

A method for providing an enhanced navigation solution related to at least one device and a cycling platform that moves through pedal cycles is provided, wherein the at least one device is positionable in any orientation with respect to the platform, and the device is locatable at any location on the cycling platform or on a body of a cyclist of the cycling platform, and wherein the at least one device comprises sensors capable of providing sensor readings, the method including: a) detecting the pedaling cycles using the sensor readings; b) determining a heading misalignment between the at least one device and the cycling platform.

A method for providing an enhanced navigation solution related to at least one device and a cycling platform that moves through pedal cycles is provided, wherein the at least one device is positionable in any orientation with respect to the platform and the device is locatable at any location on the cycling platform or on a body of a cyclist of the cycling platform, and wherein the at least one device comprises sensors, the method including: a) detecting the pedaling cycles using the sensor readings; b) determining a heading misalignment between the at least one device and the platform; c) obtaining models for speed of the platform, the traversed distance of the platform, or both the speed of the platform and the traversed distance of the platform; d) using the heading misalignment together with the at least one device heading to calculate a platform heading; and e) applying the obtained models together with the platform heading to obtain a cycling dead reckoning solution comprising position of the platform, velocity of the platform, or both position and velocity of the platform.

The method may include using the heading misalignment to enhance the navigation solution by applying motion constraints on the solution. The method may include determining a pitch misalignment between the at least one device and the platform. The method may include determining a roll misalignment between the at least one device and the platform. The method may include using the heading misalignment, the pitch misalignment, and the roll misalignment to enhance the navigation solution by applying motion constraints on the solution.

The method may include determining a heading misalignment between the at least one device and the platform, determining a pitch misalignment between the at least one device and the platform, determining a roll misalignment between the at least one device and the platform, and using the heading misalignment, the pitch misalignment, and the roll misalignment to enhance the navigation solution by applying velocity updates from the speed obtained from cycling dead reckoning.

The method may include using the position from cycling dead reckoning to enhance the navigation solution by applying said position from cycling dead reckoning as position update.

The method may include using the position from cycling dead reckoning as the position output of the navigation solution.

The cycling dead reckoning may work with platforms with multiple gear pedaling system, single gear pedaling system or pedaling system without gears.

A system for or providing an enhanced navigation solution for a cycling platform, including at least one device within the cycling platform is provided, the cycling platform moveable through pedal cycles, wherein the device is positionable in any orientation with respect to the platform, wherein the device is locatable at any location on a body of a cyclist of the cycling platform, the device including: an assembly of sensors capable of providing sensor readings; a receiver for receiving absolute navigational information about the device from an external source, and producing an absolute navigational information output; and a processor, coupled to receive the sensor readings and the absolute navigational information output, and operative to detect the pedaling cycles.

A system for or providing an enhanced navigation solution for a cycling platform is provided, including at least one device within the cycling platform, the cycling platform moveable through pedal cycles, wherein the device is positionable in any orientation with respect to the platform, wherein the device is locatable at any location on a body of a cyclist of the cycling platform, the device including: an assembly of sensors capable of providing sensor readings; a receiver for receiving absolute navigational information about the device from an external source, and producing an absolute navigational information output; and a processor, coupled to receive the sensor readings and the absolute navigational information output, and operative to: detect the pedaling cycles and obtaining models for speed of the platform and/or the traversed distance of the platform per cycle; and detect the pedaling cycles and applying the obtained models together with the platform heading to obtain a cycling dead reckoning solution comprising position of the platform, velocity of the platform, or both position and velocity of the platform.

A system for or providing an enhanced navigation solution for a cycling platform is provided, including at least one device within the cycling platform, the cycling platform moveable through pedal cycles, wherein the device is positionable in any orientation with respect to the platform, wherein the device is locatable at any location on a body of a cyclist of the cycling platform, the device including: an assembly of sensors capable of providing sensor readings; a receiver for receiving absolute navigational information about the device from an external source, and producing an absolute navigational information output; and a processor, coupled to receive the sensor readings and the absolute navigational information output, and operative to: detect the pedaling cycles; and detect the pedaling cycles and applying the obtained models together with the platform heading to obtain a cycling dead reckoning solution comprising position of the platform, velocity of the platform, or both position and velocity of the platform.

A system for or providing an enhanced navigation solution for a cycling platform is provided, including at least one device within the cycling platform, the cycling platform moveable through pedal cycles, wherein the device is positionable in any orientation with respect to the platform, wherein the device is locatable at any location on a body of a cyclist of the cycling platform, the device including: an assembly of sensors capable of providing sensor readings; a receiver for receiving absolute navigational information about the device from an external source, and producing an absolute navigational information output; and a processor, coupled to receive the sensor readings and the absolute navigational information output, and operative to: detect the pedaling cycles; determine a heading misalignment between the at least one device and the platform; obtain models for speed of the platform and/or the traversed distance of the platform per cycle; use the heading misalignment together with the at least one device heading to calculate a platform heading; and apply the obtained models together with the platform heading to obtain a cycling dead reckoning solution comprising position of the platform, velocity of the platform, or both position and velocity of the platform.

DESCRIPTION OF THE DRAWINGS

FIG. 19 shows experimental traveled distance with 21 gear ratios (a) male (b) female

DESCRIPTION OF THE EMBODIMENTS

Figure 1:
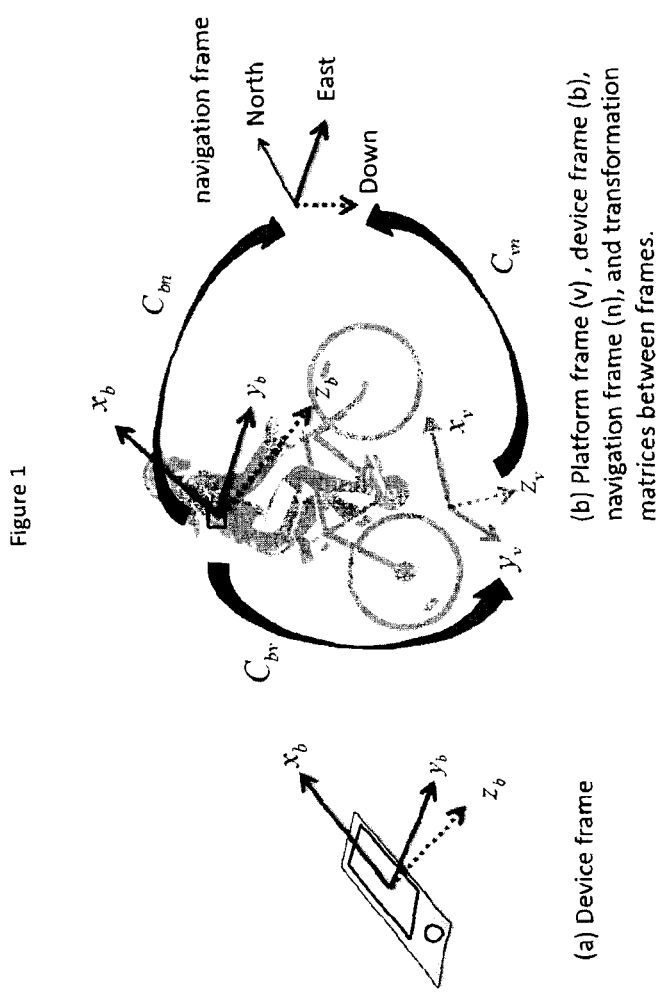
FIG. 1 shows example definitions of each coordinate frames and transformation matrices.

The present disclosure relates to method and apparatus for providing an enhanced navigation solution for cycling applications. The navigation solution is about a device within a platform, which is a cycling platform. In this document the term "cycling platform" means a wheeled moveable or stationary vehicle operable by a pedaling action, such as, for example a bicycle, a tricycle, or a unicycle amongst others. The device can be in any orientation with respect to the platform (such as, for example, in any location or orientation on the body of the cyclist). The device includes a sensor assembly. The sensors in the device may be for example, accelerometers, gyroscopes, magnetometers, barometer among others. The sensors have a corresponding frame for the sensors' axes. The present method and apparatus can work whether in the presence or in the absence of absolute navigational information (such as, for example, Global Navigation Satellite System (GNSS) or WiFi positioning).

Absolute navigational information is information related to navigation and/or positioning and is provided by "reference-based" systems that depend upon external sources of information, such as for example GNSS. On the other hand, self-contained navigational information is information related to navigation and/or positioning and is provided by self-contained and/or "non-reference based" systems within a device/platform, and thus need not depend upon external sources of information that can become interrupted or blocked. Examples of self-contained information are readings from motion sensors such as accelerometers and gyroscopes.

In some embodiments, the present method and apparatus may include one device and can provide improvement for the navigation solution using this device. In other embodiments, the present method and apparatus may include more than one device on different locations on the cyclist body to further improve the navigation solution, as detecting more human motion can help improve further the system performance. In the case with more than one device, the information may be transmitted between the devices (whether wirelessly or in a wired manner), synchronized, and shared with each other.

In some embodiments, the present method and apparatus uses detection of pedal cycles to derive the speed and/or the traveled distance per cycle and/or the traveled distance of the platform. In one embodiment, the pedal cycles are detected from gyroscope signals or filtered gyroscope signals. In another embodiment, the pedal cycles are detected from roll and/or pitch signals. In this latter case the pitch and roll values may be calculated by different techniques such as for example: (i) gyroscopes through any one of different techniques such as for example quaternions, (ii) integrated navigation solution using any type of integration or state estimation technique and integrating different sensors and/or systems such as for example some or all of the following: accelerometers, gyroscopes, magnetometers, barometer, or any navigational information updates (such as, for example, GNSS, WiFi, or any other wireless technique). In another embodiment, the pedal cycles are detected from both: (i) the gyroscope signals or filtered gyroscope signals, and (ii) the roll and/or pitch signals. When using any of the above embodiments for detecting the pedal cycles and when a source of absolute navigational information is available (such as for example GNSS) the parameters of models relating the cycle frequency with the speed and models relating the detected cycles with the distance traveled per cycle are calculated. These models can be used later to obtain the speed and the distance traveled from the detection of periodic cycles and calculating the cycle frequency, and/or to consequently obtain the total distance traveled whether the absolute navigational information are available, unavailable (for example blocked or interrupted), or degraded.

The present method and apparatus may use the detection of pedal cycles and the absolute navigational information, when available, to build the speed and traveled distance models for single-gear bicycles. The present method and apparatus may use the detection of pedal cycles and the absolute navigational information, when available, to build the speed and traveled distance models for multi-gear bicycles. In this case different models are built for the different gear ratios used during the availability of the absolute navigational information. Interpolation or extrapolation techniques may be used for obtaining models for gear ratios not used during the availability of the absolute navigational information. The present method and apparatus may also use the detection of pedal cycles and the absolute navigational information, when available, to build the speed and traveled distance models for different types of cycling platforms whether they have gears or not.

In some embodiments, the derived speed and/or traveled distance per cycle from the above discussed models (obtained in the above embodiments) together with the heading of the platform can be used to obtain a CDR solution. This solution may be used as is or used to further enhance the navigation performance of another navigation solution (such as, for example, an INS solution or an INS/GNSS solution). CDR usage can be whether the absolute navigational information are available, unavailable (for example blocked or interrupted), or degraded.

In some embodiments, the height information and/or its relative changes can be used with: (i) techniques and models determining the speed or the traveled distance per cycle of the platform, or (ii) techniques used in or with the CDR solution. The height information can be obtained from different sources, such as for example: (i) barometer; (ii) barometer integrated with height from absolute navigational information such as for example GNSS, using any type of integration or state estimation technique; (iii) barometer integrated with accelerometers using any type of integration or state estimation technique; (iv) height from an integrated navigation solution using any type of integration or state estimation technique and integrating different sensors and/or systems such as for example some or all of the following: accelerometers, gyroscopes, magnetometers, barometers, or any navigational information updates (such as, for example, GNSS, WiFi, or any other wireless technique).

In some embodiments, the pitch angle of the platform (such as for example the bicycle) can be used with: (i) techniques and models determining the speed or the traveled distance per cycle of the platform, or (ii) techniques used in or with the CDR solution. The pitch angle of the platform may be calculated from the pitch angle of the device and the pitch misalignment between the device and platform (as described below). Alternatively, the pitch angle of the platform may be calculated from absolute navigational information. Another alternative is that the pitch angle of the platform may be calculated from both: (i) the pitch angle of the device and the pitch misalignment between the device and platform, (ii) absolute navigational information. In this case any merging or integration technique can be used for both calculations of pitch angle.

In some embodiments, both: (a) the pitch angle of the platform, and (b) the height information and/or its relative changes, can be used with: (i) the techniques and models determining the speed or the traveled distance per cycle of the platform, (ii) the techniques used in or with the CDR solution.

Some Dead Reckoning (DR) concepts have been applied to pedestrian navigation by estimating motion direction (i.e. the person heading) and the traveled distance from step detection and stride length determination (known as Pedestrian Dead Reckoning (PDR)). CDR differs in that: (i) the platform is a pedestrian in PDR, while it is a cyclist in CDR, (ii) instead of step detection for walking and PDR, CDR relies on pedal cycle detection, (iii) the physics and models used for stride length estimation in PDR, are different than the physics and models used for the traveled distance per pedal cycle in CDR.

The present method and apparatus also has the advantage that the device can be on the cyclist body in various orientations and does not need to be on wheels or pedals or wired to other devices on wheels or pedals to collect any type of data, including odometry data. This distinguishes the present method and apparatus from both vehicular dead reckoning and systems mounted on bicycles (including MEMS-based sensors, wheel encoders, and/or GNSS). The present method and apparatus does not need different information from systems mounted on the platform itself and does not need any wire.

The present method and apparatus can work with different device usages and orientations with respect to the cyclist. For the purposes of this document, the different usages and orientations of the device are defined as "device use cases". The use cases may include, for example: (i) the device on leg with any orientation, (ii) the device on thigh with any orientation, (iii) the device on belt in any orientation, (iv) the device in pocket in any orientation, (vi) the device on back with any orientation, (vii) the device on chest with any orientation, (viii) the device on arm with any orientation. In all device use cases and orientations, the present method can work with any roll, pitch, and azimuth (heading) angles of the device.

The frame of axes of the device can be defined as the frame of the sensors in the device (such as for example accelerometers). For demonstration, a possible axes definition for the device frame is shown in FIG. 1, wherein the forward axis of the device is defined as x-axis, the vertical or z-axis is pointing downside from the device and the transversal axis or y-axis is defined in a way to complete a right handed coordinate system. Also for demonstration, a possible platform frame (such as for example a possible bicycle frame) is also shown in FIG. 1, wherein the axes are along the forward direction of motion of the platform, the downward direction perpendicular to the forward direction, and the lateral direction defined in a way to complete a right handed coordinate system.

In some embodiments, the present method and apparatus uses a routine to determine the heading (azimuth) misalignment angle between the device and the platform, which is the difference between the two angles (heading of the device and heading of the platform). These embodiments can work whether in the presence or in the absence of navigational information updates (such as, for example, Global Navigation Satellite System (GNSS) or WiFi positioning). The technique used for misalignment determination is able to calculate a continuous misalignment angle covering the whole misalignment space, not just discrete or pre-determined values of such angle based on discrete use case classification of the device. This technique uses the accelerometer readings from the device to estimate the misalignment angle. The presented method is able to give an output at a rate equal to or less than the rate of the accelerometer readings. In one embodiment, the present method and apparatus may take as input a buffer over a pre-determined duration of the following: the accelerometer readings, the roll angle values, and the pitch angle values. In another embodiment, the method and apparatus may be taking instantaneous sample values of the accelerometer readings, the roll angle, and the pitch angle, and only buffering the needed quantities in the corresponding steps of the method. Each sample of the accelerometer readings whether in the corresponding buffer or instantaneously received is leveled using the roll and pitch values of the device. The pitch and roll values may be calculated by different techniques such as for example those described earlier. The roll and pitch values used for levelling may be the instantaneous sample values or may be time averaged values (whether fixed time average or moving average) whether buffered or provided epoch by epoch (each epoch corresponds to an accelerometer reading sample). After the accelerometers' readings are leveled, the acceleration of the gravity value is removed from the leveled vertical accelerometer data to give the vertical acceleration component. The acceleration of the gravity can be obtained in one of several different ways including different gravity models or databases. If the input data is instantaneous, i.e. not already coming as buffered data and the vertical acceleration is not available in a buffer, then the vertical acceleration component is buffered. After levelling, the horizontal acceleration components buffers (whether calculated from input buffers or from instantaneous inputs and then buffering these needed horizontal acceleration components) or part of the buffers (based on the pedal cycle and its phases) are the input parameters to a technique to obtain the direction that has a larger variation from the acceleration signal. In one embodiment this technique may be a Principal Component Analysis (PCA) technique which generates the principle components of the two horizontal components buffers. An along-track angle is calculated based on the returned values. However, this along-track angle has a 180 degrees ambiguity, i.e. the angle can be for either the forward or backward direction of the misalignment angle. To get the motion direction, i.e. to solve the problem of the 180 degrees ambiguity and decide if the direction of the motion is forward or backward, a transformation based on the along-track angle (whether it is the correct one or the 180 opposite one) is applied to the leveled horizontal acceleration components. This operation transforms the leveled horizontal acceleration components to give the along-track acceleration component and the side-track (or lateral direction) acceleration component. The along-track acceleration component and the vertical acceleration component are buffered for the same predetermined duration if the inputs to the method are not already in buffer format. Other acceleration components such as side-track acceleration component, magnitude of horizontal acceleration, magnitude of 3D acceleration may also be buffered. To resolve the 180 degrees ambiguity in the along-track angle and calculate the correct misalignment angle, the two buffers of data may be used; the along-track acceleration component buffer and the vertical acceleration component buffer. Other buffers may be used as well. An optional step to make the buffered signals smooth; an LPF may be applied to the used buffers. The patterns in the acceleration signals in the buffers may have a different nature based on the device use case. A routine to determine or classify the use case is run on the used buffers. Based on the result of this use case determination routine different techniques are used to resolve the 180 degrees ambiguity and to correct the along-track angle to give the correct misalignment angle. If the resolution of the 180 degrees ambiguity fails, then the outcome of this process at the current iteration (i.e. the current sample of accelerometer readings) may be "no decision" which means a correct misalignment angle cannot be given.

In the embodiments using the above described heading misalignment determination technique some optional routines may be used. Any one or any combination of these optional routines can be used. A first optional routine that may be used is a routine to give a misalignment angle output in case the main technique above gives a "no decision" output; such routine is based on the history of any one or any combination of the following: (i) the buffered history of the along-track angle, (ii) the buffered history of the corrected misalignment angle, (iii) the buffered history of the output of the 180 disambiguity resolution results, (iv) the buffered history of the roll and pitch angles, and (v) the buffered history of the azimuth (heading) angle.

Another optional routine enhances the misalignment angle calculation; such routine is based on the history of any one or any combination of the following: (i) the buffered history of the along-track angle, (ii) the buffered history of the corrected misalignment angle, (iii) the buffered history of the output of the 180 disambiguity resolution results, (iv) the buffered history of the roll and pitch angles, and (v) the buffered history of the azimuth (heading) angle. This routine may rely on smoothing, averaging, or any type of filtering of any one or any combination of the above list of buffered quantities.

Yet another optional routine calculates a standard deviation of the calculated misalignment angle. In one embodiment, this routine may rely on the consistency of any one or any combination of the following: (i) the buffered history of the along-track angle, (ii) the buffered history of the corrected misalignment angle (one possibility is when it shows continuous reversals meaning frequent error in the 180 disambiguity resolution, so the standard deviation is a function of the ratio of flipping), and (iii) the buffered history of the output of the 180 disambiguity resolution results (frequent changes between 0 and 180 degrees needed correction is indicative of erroneous behaviour, so the standard deviation is a function of the ratio of flipping).

Another optional routine enhances the misalignment angle calculation of the present method when absolute navigational information (such as for example GNSS or WiFi among others) is available and capable of calculating a platform heading. This means having a redundancy of information such as: (i) device heading from one or more of its self-contained sensors, a fused version of the device's self-contained sensors, or from an integrated navigation solution; (ii) misalignment from the present method; and (iii) platform heading from the absolute navigational information. In one embodiment, the information from (i) and (iii) above can be used to calculate another version of misalignment between device and platform that can enhance, be integrated or fused with, be averaged or filtered with the misalignment from (ii). In another embodiment, the other version of misalignment between device and platform calculated from (i) and (iii) can be used with a machine learning or training technique together with the misalignment from (ii) (especially when the misalignment from (ii) has a poor performance possibly indicated by the optional calculation of its standard deviation) to obtain better misalignment in such use cases even later when the absolute navigational information is blocked, interrupted or degraded. In yet another embodiment, both the last two ideas can both be applied in a third embodiment.

In some embodiments, in order to improve the cycling navigation performance the present method and apparatus uses the determined heading misalignment angle between the device and the platform to enhance the navigation solution by applying motion constraints on the solution. In one embodiment, the determined misalignment can be used for CDR. To apply CDR the platform heading (azimuth) is needed together with the traveled distance per cycle and/or the speed of the platform. The sensors in the device (such as for example accelerometers, gyroscopes, and magnetometers) can only give the device heading (azimuth) not the platform heading. These two are not the same and have a misalignment between them as explained earlier depending on the use case of the device. So, if there is no absolute navigational information (such as for example GNSS or WiFi), or if the quality or nature of any available absolute navigational information is not adequate or not capable of calculating a platform heading, then misalignment between device heading and platform heading is needed in order to calculate the platform heading given the device heading obtained from the device's self-contained sensors. The calculated platform heading is used for CDR. Even in cases where absolute navigational information is available, the device heading and the misalignment can be used to calculate a platform heading to be used for CDR, then this solution can be integrated with the absolute navigational information to give a better solution that mitigates the drawbacks of both dead-reckoning and absolute navigational information. Any state estimation or filtering technique can be used for such integration.

In some embodiments, in order to improve the cycling navigation performance the present method and apparatus uses a routine to determine the roll and pitch misalignment angles between the device frame (the frame of sensors of the device) and the platform frame.

In some embodiments, in order to improve the cycling navigation performance the present method and apparatus uses the determined heading, roll, and pitch misalignment angles between the device and the platform to enhance the navigation solution by applying motion constraints on the solution.

In some embodiments, the heading misalignment angle can be used with any 2D navigation application where motion constraints that need this misalignment angle are applied to enhance the positioning or navigation solution (without any physical constraint on the usage of the device).

In some embodiments, the heading misalignment angle, the roll misalignment angle, and the pitch misalignment angle can be used with any 3D navigation application where motion constraints that need these misalignment angles are applied to enhance the positioning or navigation solution (without any physical constraint on the usage of the device).

Some examples of such motion constraints on either 2D or 3D navigation solution are:
a. Non Holonomic Constraints (NHC): NHC is in the moving platform frame (such as for example the bicycle frame), so in order to apply NHC the transformation between the device frame and the platform frame is needed which relies on: (i) the heading misalignment angle in case of 2D solutions, or (ii) the heading misalignment angle, the roll misalignment angle, and the pitch misalignment angle in case of 3D solution.
b. CDR applied as a constraint to another integrated navigation solution whether 2D or 3D navigation solution, thereby providing improved positioning performance with low-cost sensors than the general inertial navigation. The dependence of CDR on the heading misalignment angle is explained earlier. If CDR is to be applied in 2D, only the heading misalignment is needed, if CDR is to be applied in 3D then one of the following cases is needed: (i) both the heading misalignment and the pitch misalignment are calculated, or (ii) the heading misalignment and the pitch angle of the platform. It has to be noted that the pitch angle of the device is usually obtained as discussed earlier, so it is usually available; and the pitch misalignment is the difference between the two pitch angles of the platform and device. In general, the CDR results can be used in any of the following ways:
  i. to provide measurement update for the navigation solution (in addition to the possible calculation of the standard deviations for these updates),
  ii. to be integrated with the navigation solution in a Least Squares sense, or
  iii. used as the only standalone positioning and navigation solution (this part was covered in a discussion above).
c. Map constraints: if environment maps (of any type) are available, the map constraints can be used to enhance the navigation solution. In order to use such constraint the platform heading is needed, which can be calculated from the device heading and the misalignment calculated earlier. if there is no absolute navigational information (such as for example GNSS or WiFi), or if the quality or nature of any available absolute navigational information is not adequate or not capable of calculating a platform heading, then misalignment between device heading and platform heading is needed in order to calculate the platform heading given the device heading obtained from its self-contained sensors. The calculated platform heading will be used for the map constraint for the navigation solution. Even in cases where absolute navigational information are available, the device heading and the misalignment can be used to calculate a platform heading to be further integrated with the absolute navigational information to give a better solution. The map constraints to enhance a navigation solution can be used if CDR is utilized to further enhance the solution, or can be used if CDR is not used to enhance the main navigation solution.

When the method and apparatus disclosed herein is combined in any way with a navigation solution whether 2D or 3D, this navigation solution can use any type of state estimation or filtering techniques. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

In some embodiments, the present method and apparatus is used in a real-time solution for different purposes and applications.

In some other embodiments, the present method and apparatus is used in post mission or offline solution for different purposes and applications. In those embodiments backward smoothing can be used to further enhance the solution. Backward smoothing may be applied to CDR solution; it also may be applied to the integrated navigation solution (such as the INS/GNSS solution), or to both. Some example usages of post-mission solution may be for performance assessment because it may not need a real-time solution.

Any one or any combination of the above embodiments can be used whether in real-time solution or in post-mission offline solution.

CONTEMPLATED EMBODIMENTS

The present disclosure describes the body frame to be x forward, y positive towards right side of the body and z axis positive downwards. It is contemplated that any body-frame definition can be used for the application of the method described herein.

It is contemplated that other definitions for the platform frame can be used for the application described herein.

It is contemplated that the method and apparatus presented above can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either such technique running in post mission or in the background on buffered data within the same mission.

It is further contemplated that the method and apparatus presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in a future run (i.e. real-time run after the background routine has finished running), for example, by having improved values for the parameters of the forward state estimation technique used for navigation in the present module.

It is further contemplated that the method and apparatus presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the method and apparatus presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based paseudorange and carrier-phase measurements, such enhancement is the carrier-smoothed pseudorange.

It is further contemplated that the method and apparatus presented above can also be used with a navigation solution that relies on an ultra-tight integration scheme between GNSS receiver and the other sensors' readings.

It is further contemplated that the method and apparatus presented above can also be used with a navigation solution that uses various wireless communication systems that can also be used for positioning and navigation either as an additional aid (will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method and apparatus presented above can also be used with a navigation solution that utilizes aiding information from other moving platforms each with device(s). This aiding information can be used as additional aid (that will be more beneficial when GNSS is unavailable) or as a substitute for the GNSS information (e.g. for applications where GNSS based positioning is not applicable). One example of aiding information from other platforms with devices may be capable of relying on wireless communication systems between different devices. The underlying idea is that the platforms/devices that have better positioning or navigation solution (for example having GNSS with good availability and accuracy) can help the platforms/devices with degraded or unavailable GNSS to get an improved positioning or navigation solution. This help relies on the well-known position of the aiding platform(s)/device(s) and the wireless communication system for positioning the platform(s)/device(s) with degraded or unavailable GNSS. This contemplated variant refers to the one or both circumstance(s) where: (i) the platform(s)/device(s) with degraded or unavailable GNSS utilize the methods described herein and get aiding from other platforms/devices and communication system, (ii) the aiding platform/device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method and apparatus presented above can also be used with various types of inertial sensors, other than MEMS based sensors described herein by way of example.

Without any limitation to the foregoing, the embodiments presented above are further demonstrated by way of the following examples.

EXAMPLE

For demonstration in this example, FIG. 1 presents the definition of three coordinate frames and three transformation matrix that will be used hereafter. The symbol "b-frame" refers to the sensor axes itself as described earlier. The symbol "v-frame" presents the platform frame (such as for example the bicycle frame) which has X-axis in the forward motion direction of the platform, the Y-axis pointing to the lateral side of the platform, and the Z-axis pointing downward. The symbol "n-frame" refers to the local level frame (also called navigation frame) which has X-axis towards the north direction, the Y-axis towards the east direction, and the Z-axis toward the vertical down direction. The symbol "C_bv" represents the transformation matrix from b-frame to v-frame. The symbol "C_bn" represents the transformation matrix from b-frame to n-frame. The symbol "C_vn" represents the transformation matrix from v-frame to n-frame.

In this example the platform is assumed to be a bicycle for demonstration purposes. In general the platform can be any cycling platform that moves by pedaling such as for example bicycle, tricycle or unicycle.

Figure 2:
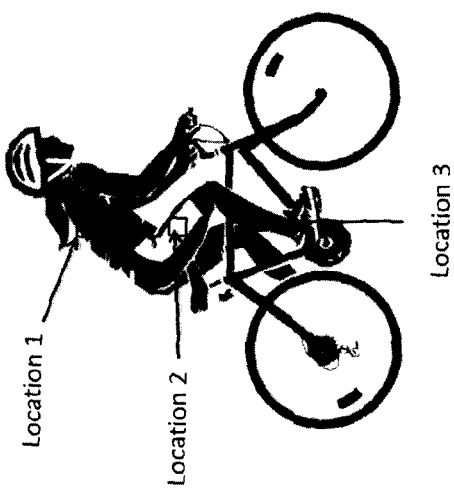
FIG. 2 shows examples for some possible device locations.

As mentioned earlier, in some embodiments, the present method may include one device and can provide improvement for the navigation solution using this device. In other embodiments, the present method may include more than one device on different locations on the cyclist body to further improve the navigation solution, moreover detecting more human motion can help improve further the system performance. In the case with more than one device, the information may be transmitted between the devices (whether wirelessly or in a wired manner), synchronized, and shared with each other. Some example possible locations to put on several devices are shown in FIG. 2.

Pedaling V.S. Non-Pedaling

By pushing pedals periodically, the front gears transfer the motion to the chain, then this motion is transferred to the rear gears and consequently to the rear wheel. When there is no pedaling, three possible actions occur: coasting, braking, or static. Coasting or braking involve scenarios where the cyclist was pedaling and then stops pedaling. Alternatively, while increasing the speed by pedaling, frictions such as ground friction, wind drag, tire friction, etc. will slowly decrease the bicycle's speed. Most of the bicycles have freewheel that allows the rear wheel to keep rotating while the front crank arms are static. Therefore, CDR cannot work in the coasting/braking circumstances in addition to static circumstances and the INS mechanization will be used instead with possibly other updates such as NHC, and possibly ZUPT during static. Pedaling frequency can be monitored either by the accelerometer or gyroscope. Nevertheless, inertial measurements generated by the pedaling motion are given in the sensor frame, which has a different orientation and translation in the three dimensional world in every run. In addition, recorded motions are different in relation to the device's orientation and location with respect to the human body, such as a backpack, on the thigh, or lower leg. Therefore, the information used to detect non-pedaling motion exclude raw accelerations and angular rates. The coasting detection technique uses attitude from the integrated navigation solution as input. In case the attitude has flipping issue (such as 179 to −179 on roll angle), protection technique is used to make all values up to positive range. The output flag is "0" which represents non-pedaling and "1" which represents the pedaling motion. The technique uses a two second window to decide if the current motion is non-pedaling or pedaling. It detects if there is one or more than one cycle by cross correlation or Fast Fourier transform (FFT); either are used with peak detection. Peak detection is intended to validate the completeness of a period in the attitude signal. If the detected cycle and frequency are within reasonable range then the conditions are satisfied, the pedaling flag is set to "1".

Figure 3:
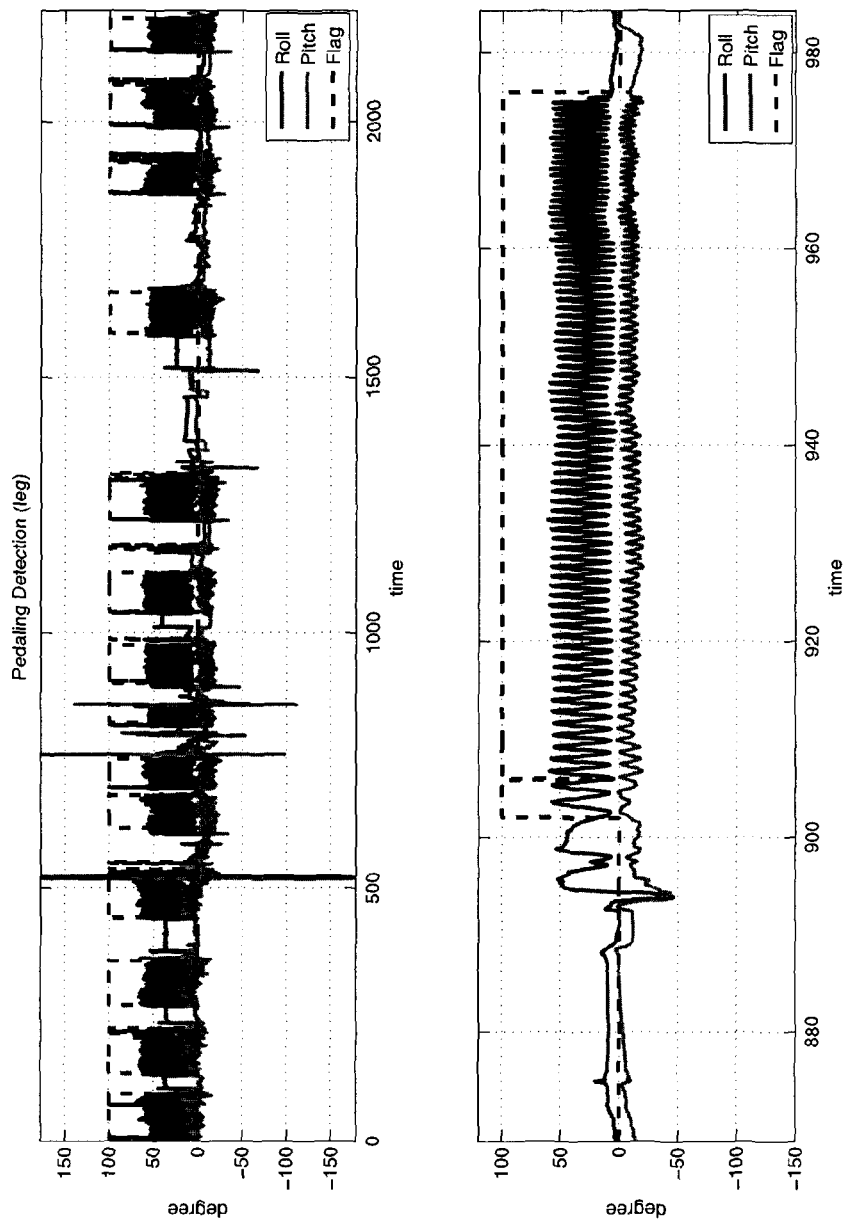
FIG. 3 shows (a) a result of coasting detection with device on leg, (b) zoom-in on one pedaling section as well as the coasting sections before and after.

One example of coasting detection is shown in FIG. 3. It shows an example of the non-pedaling and pedaling detection result where the device was placed on right leg. The black line indicates the instantaneous decision of coasting detection where value "1" has been enlarged to "100" in order to make it easy to observe. The darker gray line is the roll angle of the device and lighter gray line is the pitch angle of the device. FIG. 3(a) shows the periods of pedaling and non-pedaling and their detection. FIG. 3(b) shows a zoom-in on one pedaling portion preceded and succeeded by coasting portions; it also shows irregular motion before the pedaling started and it was correctly detected as non-pedaling.

The present method and apparatus may use this routine to determine when to trigger CDR and misalignment calculation. When no pedaling is detected (such as coasting or braking), CDR may not be used or different models may be trained/used.

CDR Module

The basic idea behind CDR is the usage of periodical human motion to improve navigation solution. Intuitively, pedal frequency is the critical factor in determining the platform (in this example bicycle) forward speed and the traveled distance. The discussion here is an example of one embodiment of the present method. This discussion considers single-gear bicycle; details regarding multi-gear bicycles will follow. In this example, a complete GNSS/INS integration solution is implemented first to estimate roll, pitch, and heading angle in navigation frame. Pedal movement generates sinusoidal wave on the roll or pitch signal which depends on the setup orientation of the device. Therefore, initial orientations are important in this example (for example they can be obtained from accelerometer while stationary in the beginning). The technique detects each pedal cycle by detecting peaks on the sinusoidal wave and derived the frequency of each complete cycle. It is worth mentioning that it requires no precise parameters like calculating bicycle's linear acceleration, gear ration, rim size, tire size, length of pedal arm, vertical force applied on pedal, etc. The corresponding forward speed and traveled distance after one complete cycle is derived from GPS solutions. In other word, the speed and traveled distance module are training in real-time while the device receives good GPS measurements.

The device used requires prior knowledge of coordinate of staring point which is usually given by GPS. Since the position and velocity solutions estimated by GPS are given under n-frame, the horizontal distance and speed can easily derived by $$\text{Forward speed} = \sqrt{dv_E + dv_N} \quad (1)$$

$$\text{Traveled distance} = \sqrt{dN + dE} \quad (2)$$

Where $dv_E$ and $dv_N$ are estimated from GPS velocity measurements; dN and dE are estimated by differential GPS position solutions.

Figure 4:
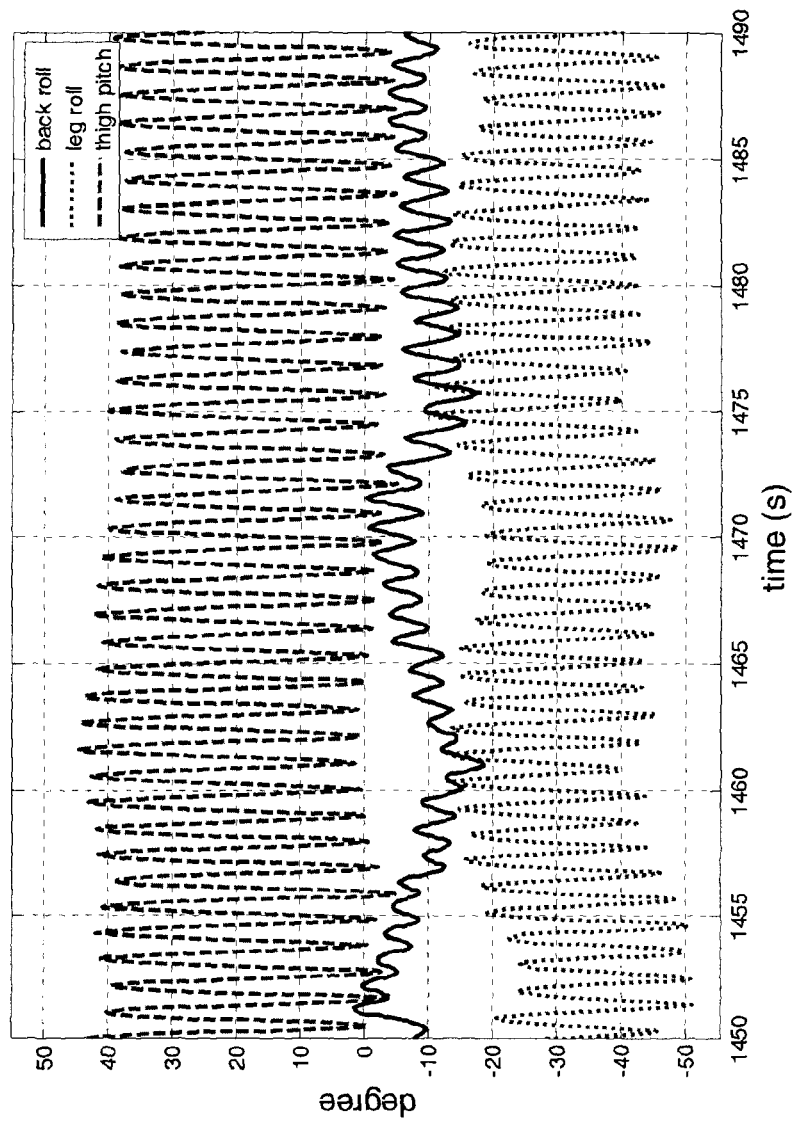
FIG. 4 shows the attitude signals at different device locations.

FIG. 4 shows the sinusoidal wave estimated by leg or thigh has relatively bigger amplitude. Therefore, the accuracy rate of detecting pedal cycle by thigh or leg will be better compared to the result generated by a device located on a human upper limb. However, all of them have a sine wave in attitude signal. Therefore, pedal cycle can be detected with the single device wherever it is located. With multiple devices, the pedal frequency is based on the estimation results from the device with a higher amplitude in attitude signal. which means that device moves with the pedal significantly, such as a device on a thigh or leg. By combing the estimated solutions from multiple devices, not only is the navigation solution improved but also additional human motion can be performed (such as knee angle motion).

The technique records instantaneous forward speed (derived from GPS signal) within each complete pedal cycle (detected by gyroscope and/or pitch and/or roll). Raw measurements from MEMS inertial sensors, barometer, magnetometer and GPS are fused using Extended Kalman filter (EKF). The estimated state vector is given in n-frame. Pedaling movement is a regular and periodical behaviour which can be easily found in attitude signal. The attitude signal with larger variance is chosen to be the angle which moves with the pedal. The following peak detection technique is utilized:

1. Detect three adjacent slope changing points and store a vector called 'peak' for each.
2. If the amplitude difference between the first peak and third peak is bigger than 10 degrees, delete the first one and keep searching for the next slope changing point.
3. If the amplitude difference between adjacent peaks is bigger than 10 degrees and the epoch difference between adjacent peaks is less than 5 epochs (in this case with data rate 20 Hz, intervals less than 0.25 second will be deleted), then a complete cycle is detected and its related parameters are stored.
4. If a complete cycle has been detected with pedaling flag set as "1", search the corresponding GPS derived speed and store this speed to further use in building speed and traveled distance models.
5. Error detection: i) If a complete cycle has corresponding zero forward speed, it is detected as an error; ii) if a complete cycle has heading changing rate larger than 45 degrees, it is detected as an error; iii) if a complete cycle has significant reduced speed or reduced pedaling frequency compared to three previous cycles, it is detected as an error.

This method has an advantage that window size is automatically adjusted. One complete pedal cycle will be detected by finding two high peaks or two low peaks on the attitude signal. When one complete cycle has been detected, corresponding forward speed will be derived from the GPS velocity or differential position techniques. It will use the standard deviation provided in GPS file to make a choice in taking velocity derived speed or differential position derived speed. If GPS derived forward speed has more than one measurement within one cycle, the average speed will be used to build the module. The pedal cycle time (Ts) is calculated by the time difference between the first peak and second peak. Then the corresponding pedal frequency is given by f=1/Ts.

Figure 5:
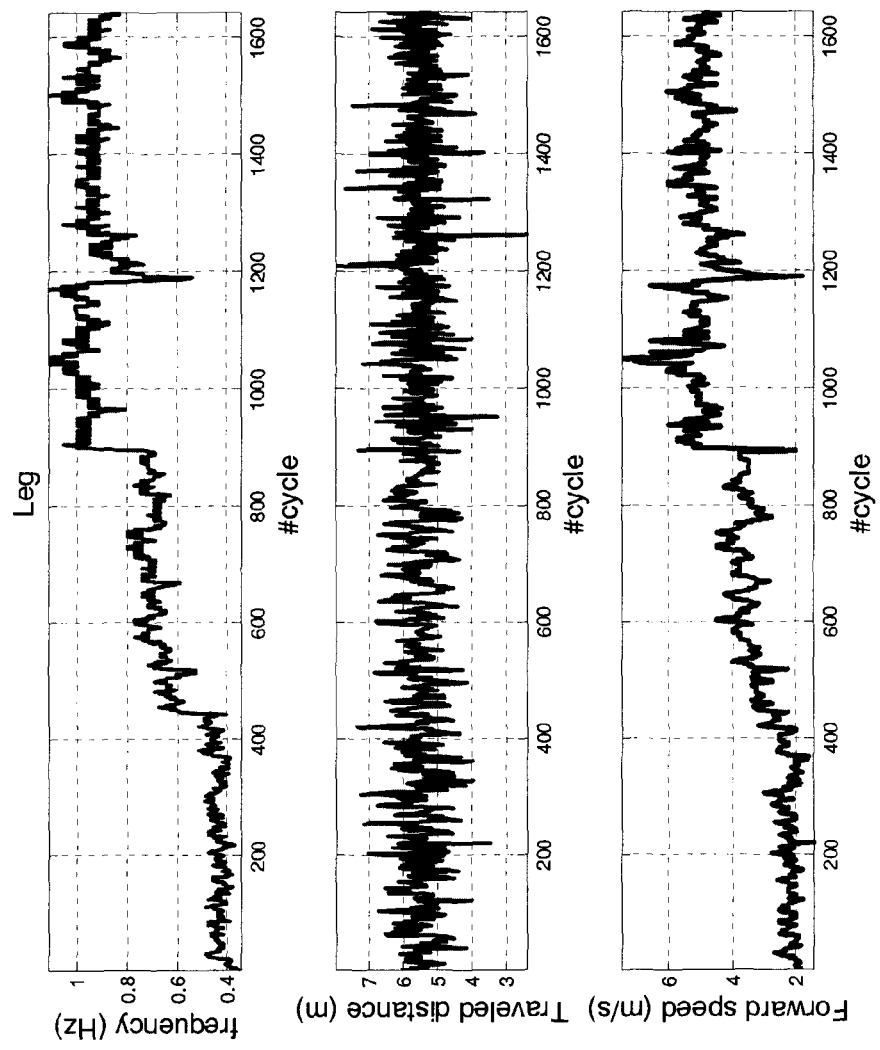
FIG. 5 shows the relationship between pedal cycle frequency, forward speed and traveled distance (scenario I, leg).
Figure 6:
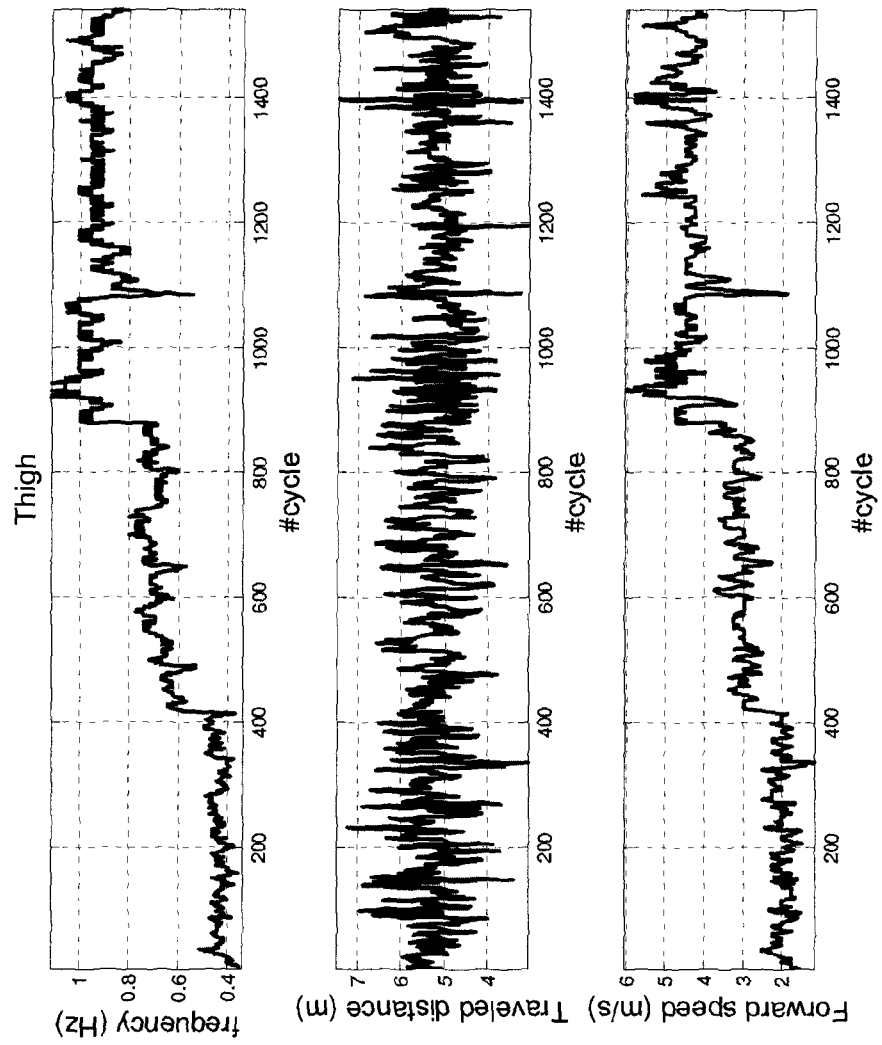
FIG. 6 shows the relationship between pedal cycle frequency, forward speed and traveled distance (scenario I, thigh).

FIGS. 5 and 6 show the relationship of pedal frequency, forward speed and traveled distance per cycle. These measurements were generated from a real scenario. The traveled distance for each cycle is shown in the middle graph while the forward speed for each cycle is shown in the bottom graph. In each pedal cycle the cycle has traveled a similar distance. Whether the device is on leg or thigh shows the same results.

Figure 7:
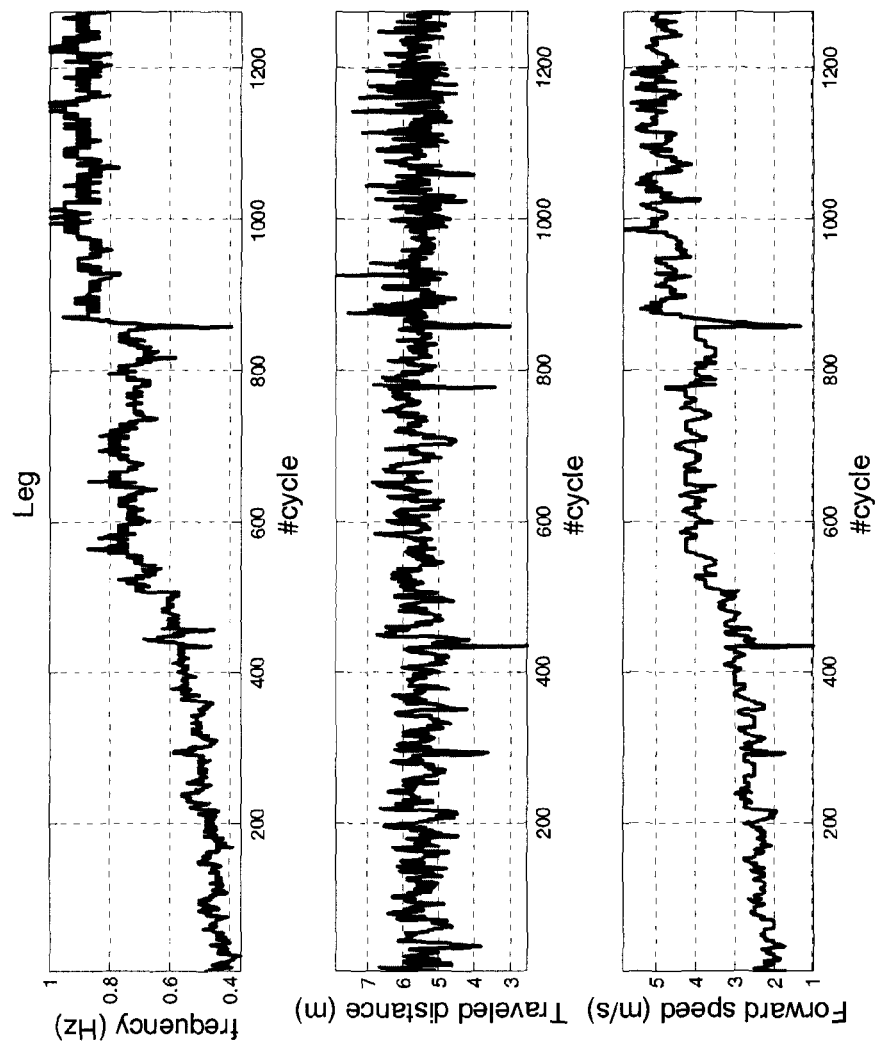
FIG. 7 shows the relationship between pedal cycle frequency, forward speed and traveled distance (scenario II, leg).
Figure 8:
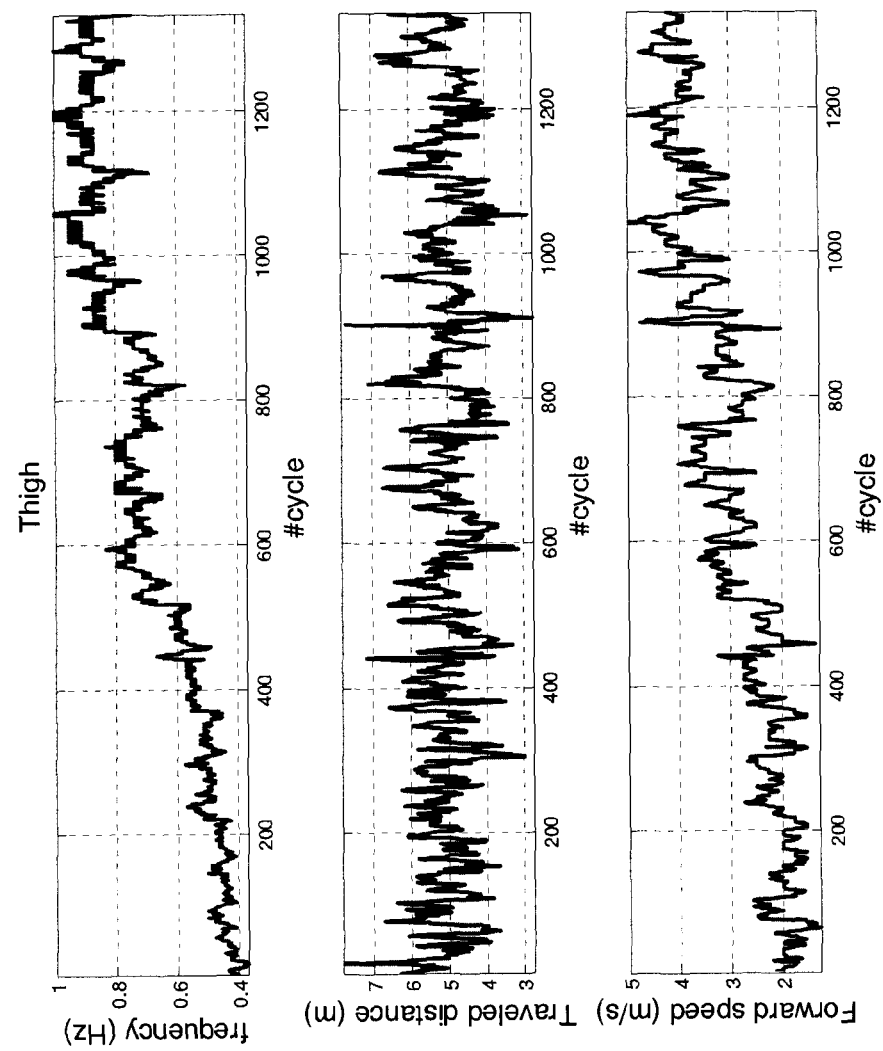
FIG. 8 shows the relationship between pedal cycle frequency, forward speed and traveled distance (scenario II, thigh).

FIGS. 7 and 8 show the relationship of pedal frequency and forward speed in another experiment. The traveled distance for each cycle is shown in the middle graph while the forward speed for each cycle is shown in the bottom graph. The Figures show that pedal frequency has a strong relationship with forward speed. Either device is on leg or thigh, it shows the same results.

Figure 9:
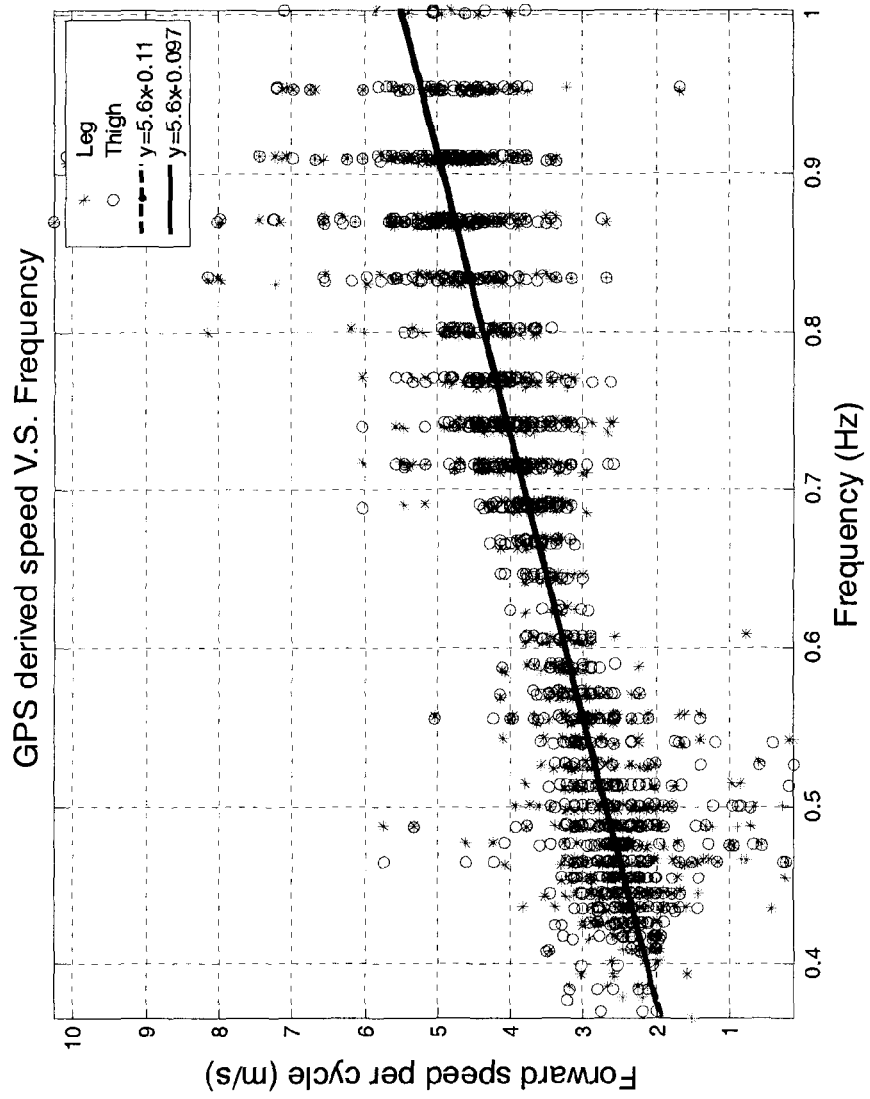
FIG. 9 shows the speed model with the corresponding pedal cycle frequency.

The preliminary relationship between pedal frequency and forward speed uses a first order polynomial to build a best fit line. The corresponding parameters (a: scale, b: offset) are given in Table 1 where the modules for thigh and leg have been built. In this table, forward speeds estimated by GPS velocity and differential position all have parameters. An example to describe the linear relationship between forward speed and pedal frequency is shown in FIG. 9. This figure demonstrates the similarity of both the phone on the leg and the phone on the thigh.

TABLE 1

|  | GPS derived speed | | GPS position derived speed | |
| --- | --- | --- | --- | --- |
|  | a | b | a | b |
| Run 1 | | | | |
| Leg | 5.7256 | −0.3673 | 5.7782 | −0.1838 |
| Thigh | 5.7888 | −0.3860 | 5.7060 | −0.1561 |
| Run 2 | | | | |
| Leg | 5.5337 | −0.3684 | 5.5782 | −0.1065 |
| Thigh | 5.6938 | −0.4011 | 5.5903 | −0.0966 |

Best Fit Line Parameters for Controlled Experiment

Once the traveled distance within one complete cycle has been build up, the absolute heading information can be estimated by gyro-based heading or magnetometer-based heading. The position solution is then estimated by the equations:

$$\Delta P_f = C_p \times \hat{s}_j$$

$$dE_{k+1} = \Delta P_f \sin(A_z) + dE_k \quad (3)$$

$$dN_{k+1} = \Delta P_f \cos(A_z) + dN_k \quad (4)$$

Where $C_p$ is the number of detected cycles; $A_z$ is the azimuth (heading) of the platform (i.e. bicycle), which is derived from the portable device heading and the heading misalignment angle between b-frame and v-frame obtained from the technique as described below. Since the update frequency is dependent on the frequency of the pedal, the measured heading information within one complete cycle can have several values (varying with time). The estimated heading used in equation (3) and (4) is the average value from all the heading solutions within one complete cycle. Some examples of heading sources that may be used are: (i) device heading from integrated solution, (ii) magnetometer (that may be used based on the quality of its measurements), (iii) gyro-based heading, and (iv) heading from GPS velocity. The first three are device headings so they need heading misalignment determination (as described below) to obtain platform heading. The heading measurement from GPS is shown in following:

$$A = \tan^{-1} \frac{V_{GPS,E}}{V_{GPS,N}} \quad (5)$$

Figure 10:
FIG. 10 shows the positioning solution estimated by CDR only.

FIG. 10 shows the trajectories estimated by the distance module provided by a single device (positioned on the leg). For demonstration purposes and to show the CDR performance, the heading solution is from GPS velocity derived heading which can be found in Equation (5). For the bicycle used in experiments, the average traveled distance estimated from back (5.3843 meter), thigh (5.2844 meter) and leg (5.5222 meter) are very consistent in one cycle. In FIG. 10, the positioning results for loops with different speeds are shown; the slow speed is between 1 and 3 meters per second, the medium speed is between 3 and 5 meters per second and the fast speed is between 4 and 7 meters per second. The trajectories were calculated according to Equations (3) and (4) and no integrated solution was used (i.e. no measurement updates), but the used heading was derived from GPS as mentioned above.

Figure 11:
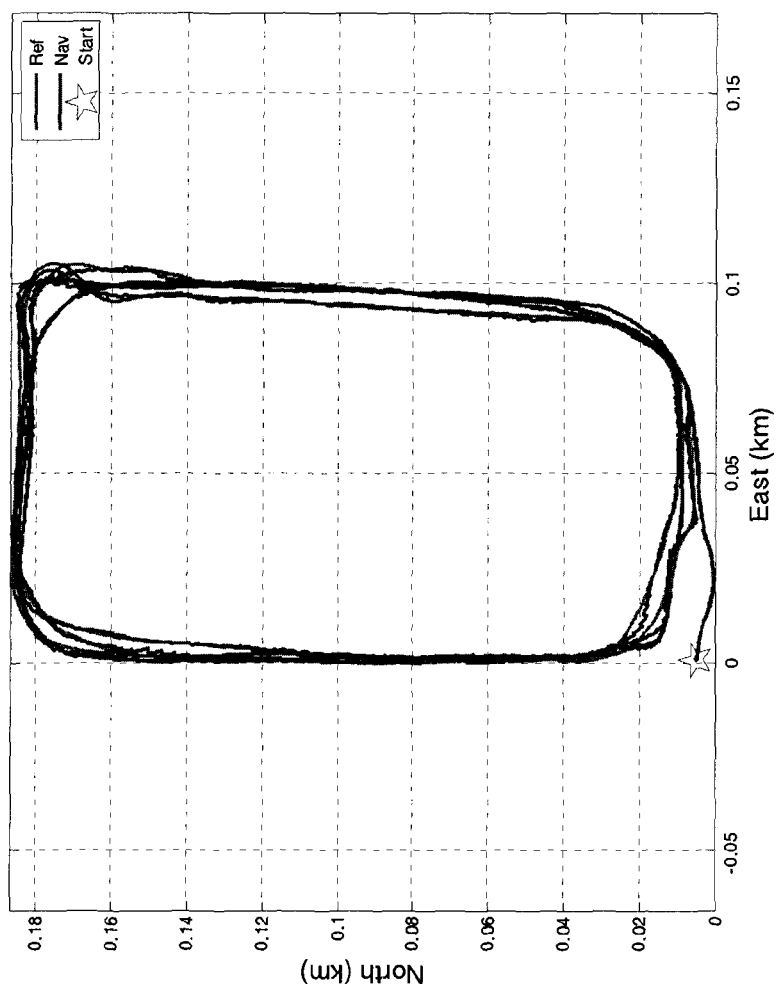
FIG. 11 shows solutions in the real trajectory with the low speed.
Figure 12:
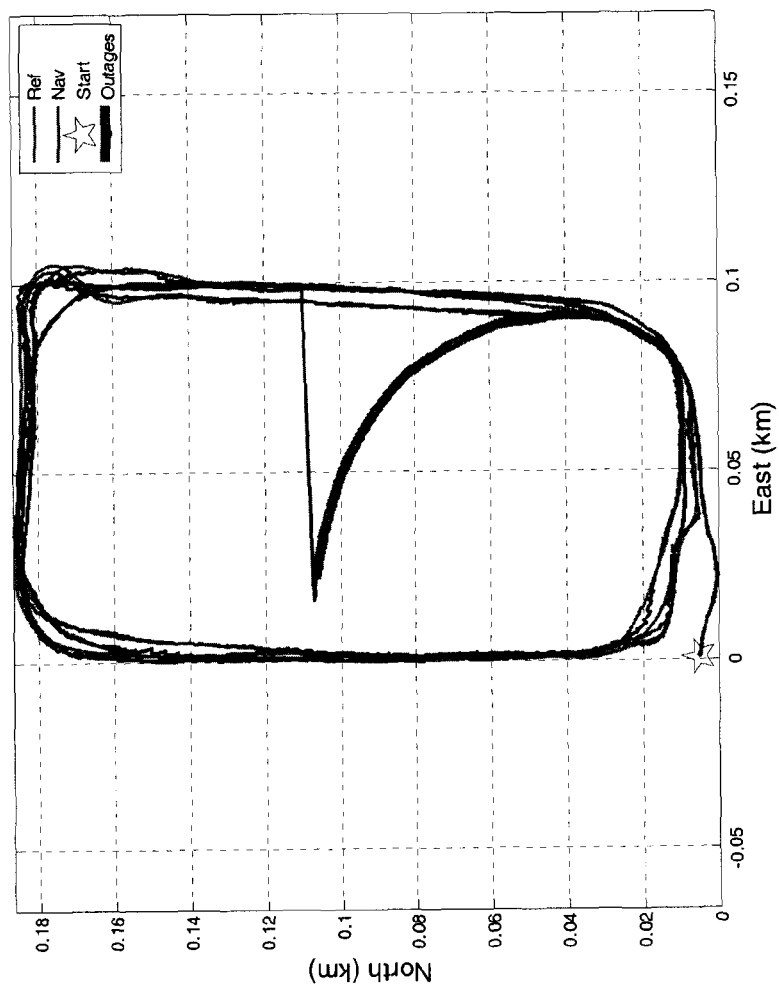
FIG. 12 shows the trajectory with 30 seconds simulated GPS outage.
Figure 13:
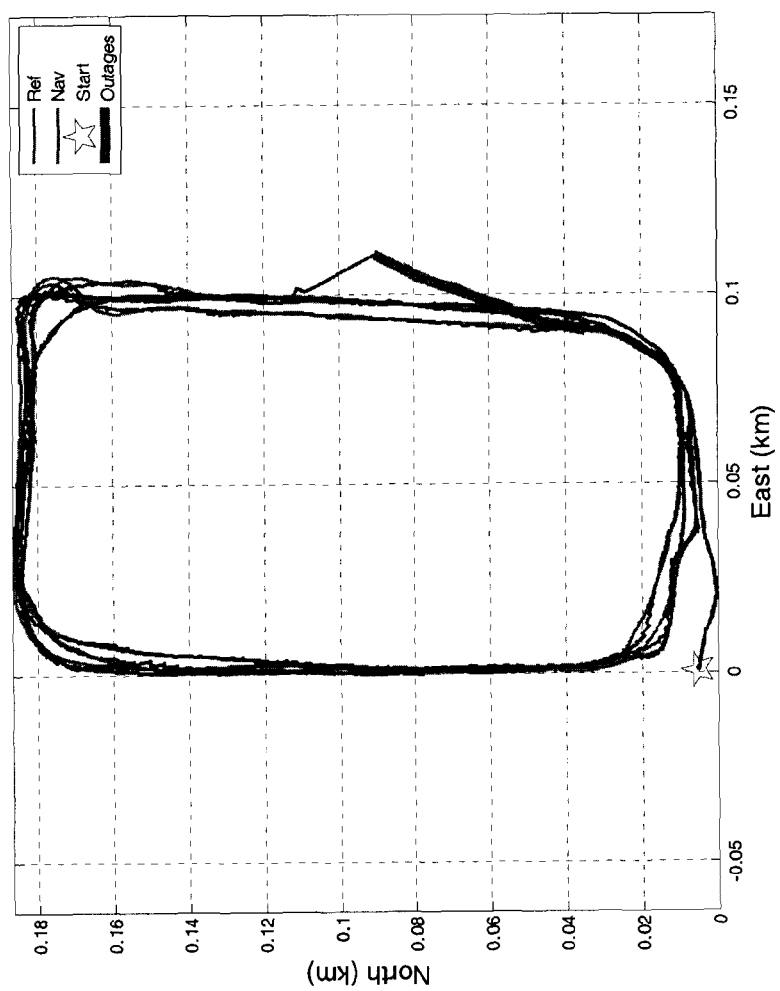
FIG. 13 shows the trajectory with the implementation of NHC.
Figure 14:
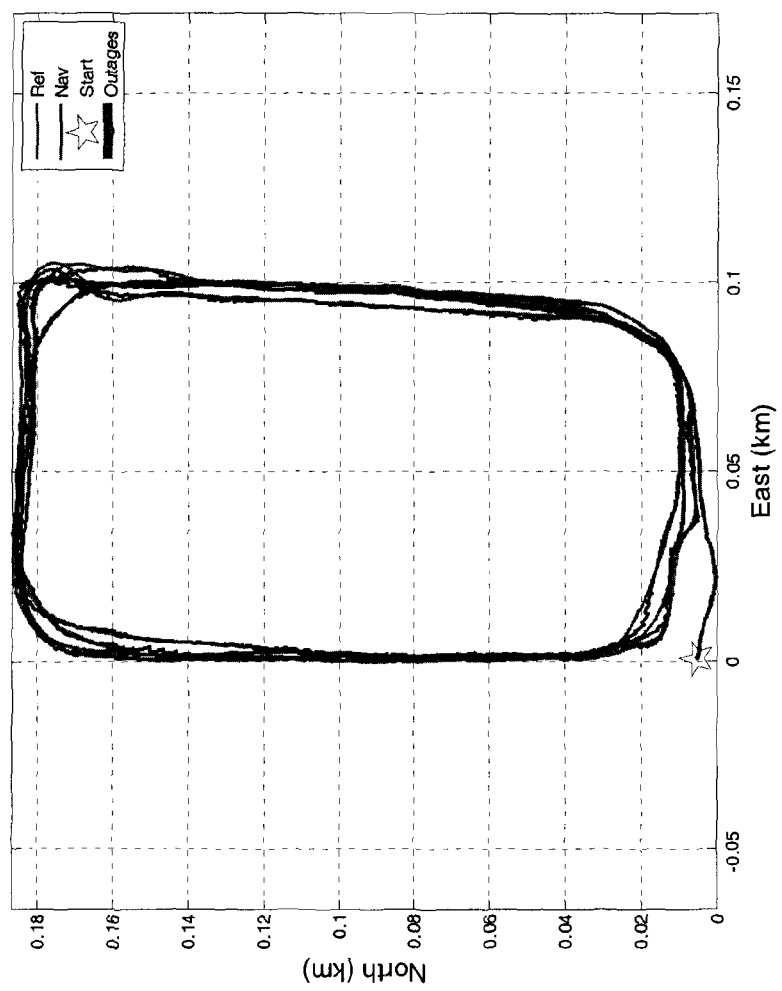
FIG. 14 shows the trajectory with the CDR module with external heading solution from GPS velocity.

Another demonstration of the CDR performance is shown in the following results. The trajectory with low speed without GPS outage is shown in FIG. 11. The EKF result and the backward smoothing result used as a reference. In order to give a clear performance comparison, 30 seconds GPS outage is simulated in low speed loops as shown in FIG. 12. The position error accumulated during GPS outage is marked in a very thick gray line. NHC only is applied to demonstrate its performance versus CDR. After applying NHC only, the result is shown in FIG. 13 where position error is reduced significantly. FIG. 14 shows the result after applying speed and distance models of CDR. According to experiments, the position error performance without 30 seconds GPS position and velocity updates (i.e. with a 30 second GPS outages), the accumulated maximum position errors are summarized in Table 2.

TABLE 2

| Methods | Maximum North error (m) | Maximum East error (m) |
| --- | --- | --- |
| Original | 7.82 | 80.64 |
| NHC | 27.73 | 8.31 |
| CDR | 7.97 | 2.34 |

Maximum Position Error of CDR and Traditional Solutions

Figure 15:
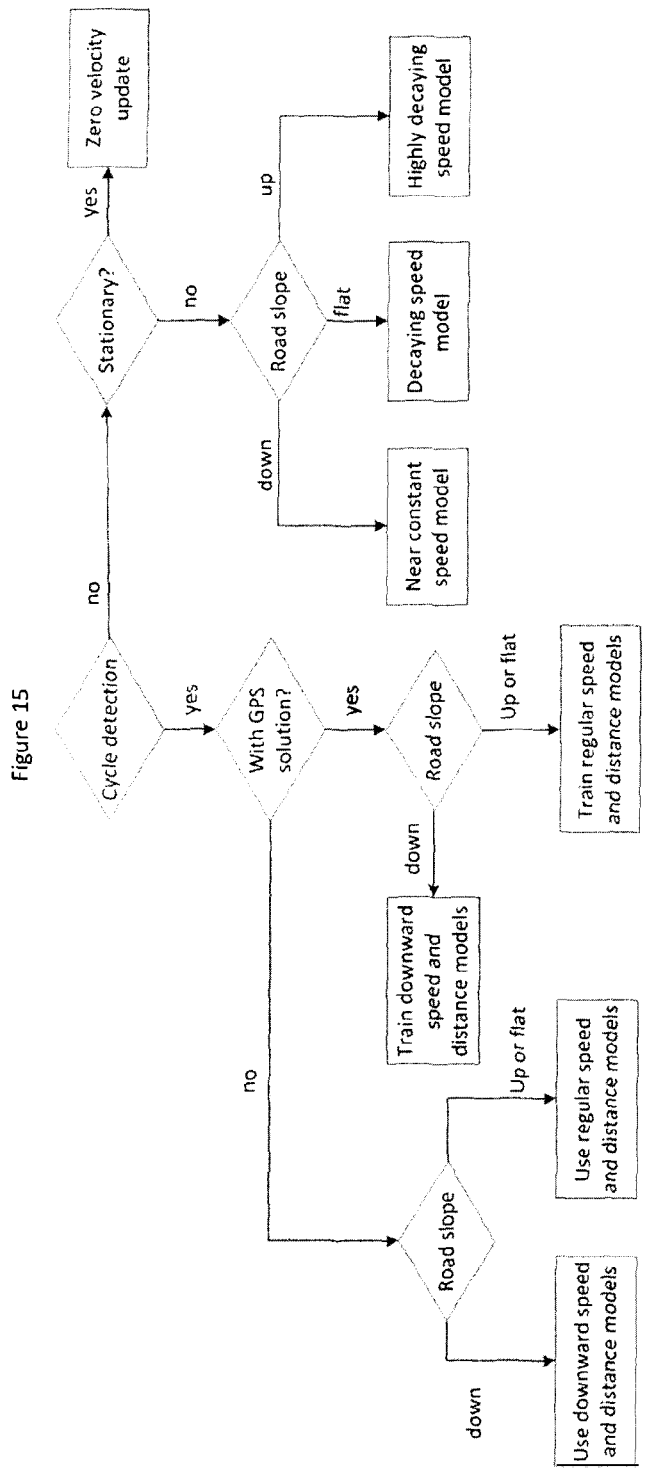
FIG. 15 shows a flowchart of one embodiment of the present method and apparatus.

There are different types of cycling platforms; some have the pedal cycle rigidly associated with the wheel motions and some do not. For the latter group, the models for speed and distance will be affected by: (i) road or terrain slopes such as when the platform is going downward with a noticeable slope, (ii) and by the case when the cyclist reaches a high speed and stop pedaling while still the wheels rotate and the platform moves. An example of one advanced embodiment for this latter type of platform, where the embodiment accounts for vertical slopes of road or terrain (flat, upward, downward) when building the speed and distance models and when using them as well for CDR is described in FIG. 15. In this embodiment, two sets of models are obtained during GPS availability and during pedal cycle detection: (i) one set for the flat and upward, or (ii) one set for the downward. In other embodiments, one set of models can be obtained considering the downward factor in training to unify the models. In case the slope of the road (through bicycle motion) is detected as being flat or upward and pedaling is detected during GPS availability, CDR training phase as described above will be applied. If the slope is being downward and pedaling is detected during GPS availability, one of two possibilities can be used: (i) CDR models for downward motion are trained, (ii) normal CDR models are trained but consider the downward factor which is a function of road slope and caused by the effect of the gravity component. When using the models for CDR (utilization phase), several checks take place. First, if there are pedal cycles the obtained models are used for CDR. If there is no pedal cycles detected and if the system is stationary (the static detection is a separate routine to detect being stationary; possibly from accelerometers and gyroscopes), then zero velocity update (ZUPT) are used. If there is no pedal cycle detection and the system is not stationary, which is a phenomenon that can happen during cycling (such as coasting/braking) different models will be applied based on the slope being flat, upward, or downward. If the slope is downward, a near constant speed model may be applied because gravity component and frictions (such as those caused by ground friction, wind drag, tire friction, etc.) will have opposite effects. If slope is flat or near flat, a decaying speed model may be applied because friction will slowly decreases the bicycle's speed. In case the slope is upward, a highly decaying speed model may be applied because both gravity and friction will decrease bicycle's speed. These latter models are just approximations that give a tentative prediction for CDR, but they are beneficial either if CDR is implemented alone to give a solution or if CDR is updating or constraining another inertial or integrated navigation solution, as this CDR update will still help the solution during GPS outages from severe error growth.

Multi-Gear CDR

Figure 16:
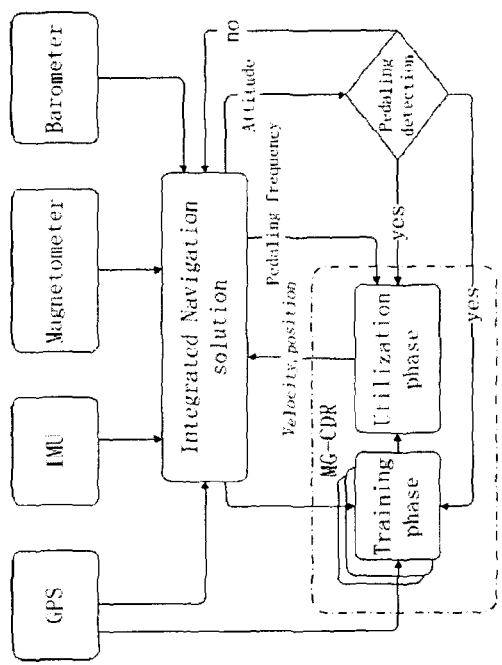
FIG. 16 shows a flowchart of MG-CDR embodiment of the present method and apparatus

The system and method according to the invention provide an embodiment for a multi-gear cycling platform wherein the system automatically detects a change of gear ratios and switches to the proper CDR model by either searching existing models or using interpolation/extrapolation and at least two existing models. This advanced embodiment is defined as MG-CDR. FIG. 16 is an example flowchart of MG-CDR. The difference between normal CDR and MG-CDR is that the latter can accommodate multiple models for the different gear ratios. In this case different models are built for the different gear ratios used during the availability of the absolute navigational information. Interpolation or extrapolation techniques may be used for obtaining models for gear ratios not used during the availability of the absolute navigational information. The other routines explained above for single-gear CDR are similar in MG-CDR. The former explanation regarding downward speed model, near constant speed model, decaying speed model and highly decaying speed model still applies.

Figure 17:
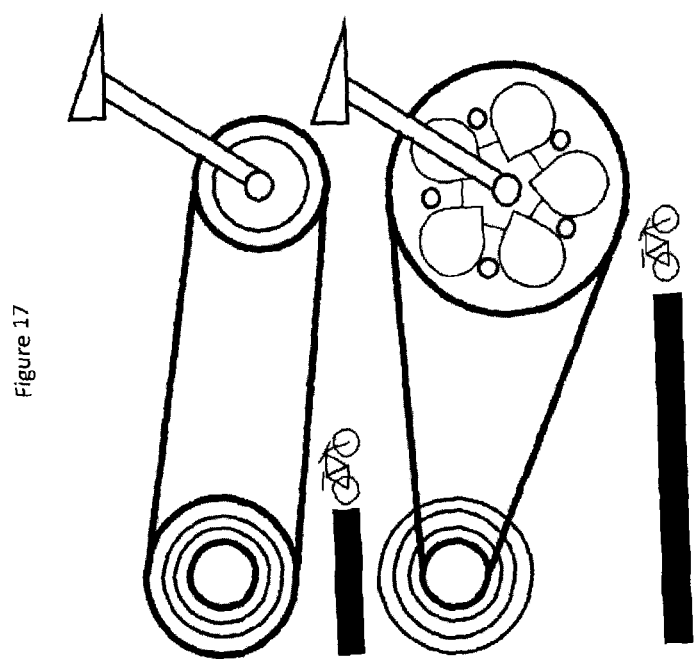
FIG. 17 shows how gear ratio determines traveled distance

The use of multi-gears enables the wheel to gear ratio to change, and consequently the traveled distance per pedaling cycle changes as well as the speed relation with pedaling frequency. The gear ratio is defined as the front gear size divided by the rear gear size. FIG. 17 shows a relationship between the gear ratio and distance traveled. As shown in the figure, traveled distance is shorter when the front gear is small and the rear gear is bigger. When the cyclist changes the gear ratio, the traveled distance will change according to the gear ratio and therefore by comparing the buffer history of traveled distance, the technique detects the significant change and then uses a new training model to build up another CDR model.

Figure 18:
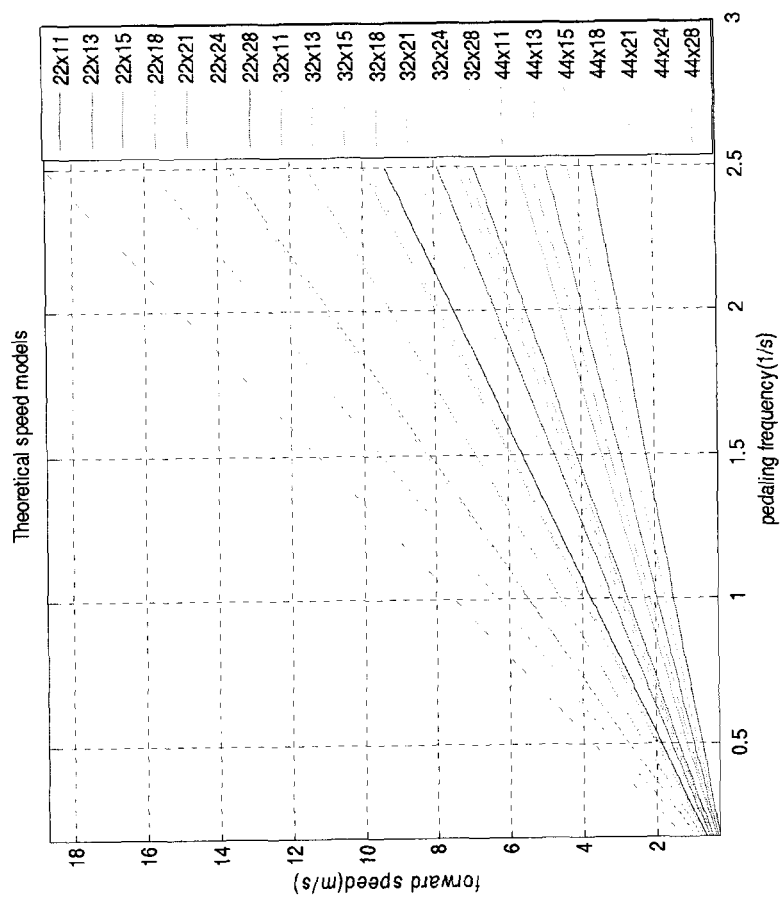
FIG. 18 shows theoretical speeds models with 3 gears at front and 7 gears at rear

FIG. 18 illustrates theoretical speed models with 3 gears at front and 7 gears at rear. The theoretical parameters were calculated based on rim size 24 inch (0.61 m), tire size 1.5 inch (0.04 m). There are 21 combinations of gear ratio and therefore 21 speed models. As shown in the figure, for a certain gear, the relationship between pedaling frequency and forward speed is linear. Consequently, the linear equation y=ax+b is chosen.

Figure 20:
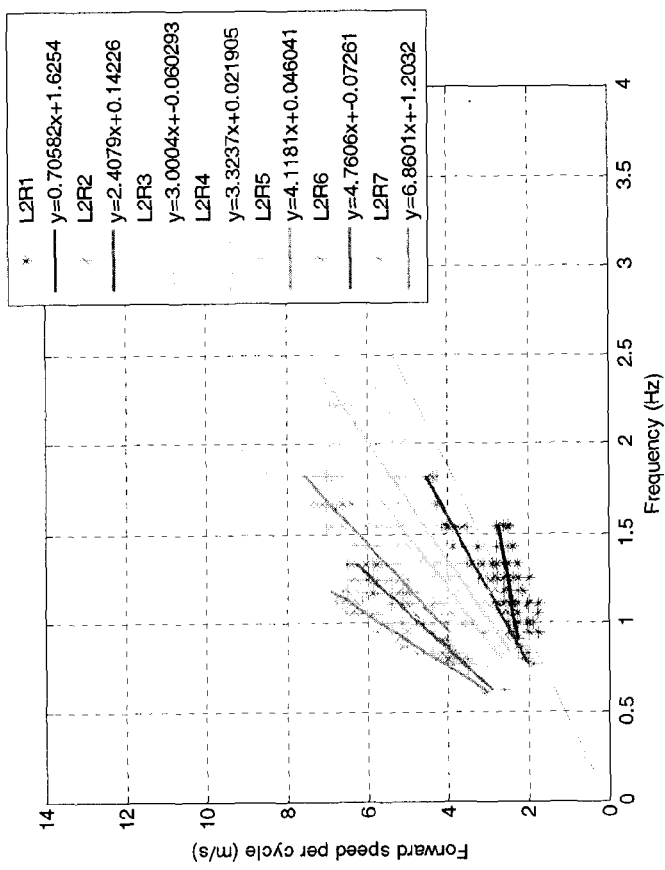
FIG. 20 shows theoretical speed models vs experimental speed models FIG. 21 Outage 1: (a) Performance with 1 minute simulated (Cyclist 1, bicycle A) (b) Zoom in part of Outage 1

FIG. 19 summarizes the experimental traveled distances with different gear ratios from male and female users respectively. These traveled distance were collected by a mountain bicycle with a 21 gear ratio and a mountain bicycle with a 24 gear ratio. While the presented method and apparatus needs to have independent forward speed and traveled distance, it use the buffer history of traveled distance to decide which CDR models will be used to derived these measurements. In order to validate the difference between trained MG-CDR models and theoretical models, the cyclists rode in a straight line several times utilizing all possible gear combination. The designated road was under open sky in order to maintain a good quality GNSS signal. FIG. 20 describes the performance of experimental speed models, where the solid lines represent the trained models and the dash lines represent the theoretical models. The start points represent the measurements pair ($f_k$, $V_k$). The legend title "L" means the gear hub number on the left hand side, while legend title "R" means the gear hub number on the right hand side. As shown in FIG. 20, forward speed increases quicker with a higher gear ratio. This is verified by the concept mentioned in FIG. 17. The biggest difference between theoretical models and experimental models are "L2R1" which is caused by less effective pedaling. This phenomenon happens when friction is very low (the test field is flat) and the gear ratio (1.14) is too small, this causes the fast pedaling motion to be redundant. In other words, most of the human power will not be transferred into effective force. The forward speed is mainly a result of Newton's first law of motion.

Since the traveled distance is proportional to the gear ratio, theoretically, if the system has two correct CDR models, the third one can be obtained by interpolation, because as shown in FIG. 19, the change of parameters of the MG-CDR models is linear with the gear ratio. This also shows that the MG-CDR technique is feasible in adjusting the CDR models by matching the traveled distance parameter and therefore, cyclists do not have to train each gear one by one. According to the experiments, few inconsistent traveled distances can exist due to the following reasons: 1) The accuracy of the GNSS velocity measurements; 2) discontinuous wave within one cycle (cyclist did not pedal smoothly); or 3) platform has a bigger roll angle around tilt wheel with regard to the ground). This usually happens during turning. The inconsistent pairs will be deleted under two cases: 1) pedaling frequency has significantly changed with respect to the previous few pedaling frequencies; or 2) velocity has suddenly reduced or increased. These are designed to avoid braking and coasting. Table 3 presents an example of trained traveled distance for all gear ratios for one bicycle.

TABLE 3

| Front gear tooth | Rear gear tooth | Gear ratio | $\hat{s}$ | STD of $\hat{s}$ |
|---|---|---|---|---|
| 22(L1) | 28(R1) | 0.79 | 1.5885 | 0.208 |
| 22(L1) | 24(R2) | 0.92 | 1.724 | 0.211 |
| 22(L1) | 21(R3) | 1.05 | 1.8752 | 0.1556 |
| 22(L1) | 18(R4) | 1.22 | 2.3324 | 0.221 |
| 22(L1) | 15(R5) | 1.47 | 2.5886 | 0.211 |
| 22(L1) | 13(R6) | 1.69 | 3.0692 | 0.399 |
| 22(L1) | 11(R7) | 2.00 | 3.5975 | 0.1917 |
| 32(L2) | 28(R1) | 1.14 | 2.078 | 0.249 |
| 32(L2) | 24(R2) | 1.33 | 2.5242 | 0.164 |
| 32(L2) | 21(R3) | 1.52 | 2.9268 | 0.193 |
| 32(L2) | 18(R4) | 1.78 | 3.3201 | 0.212 |
| 32(L2) | 15(R5) | 2.13 | 4.1203 | 0.246 |
| 32(L2) | 13(R6) | 2.46 | 4.645 | 0.217 |
| 32(L2) | 11(R7) | 2.91 | 5.5992 | 0.348 |
| 44(L3) | 28(R1) | 1.57 | 2.8127 | 0.136 |
| 44(L3) | 24(R2) | 1.83 | 3.4981 | 0.197 |
| 44(L3) | 21(R3) | 2.10 | 3.8613 | 0.138 |
| 44(L3) | 18(R4) | 2.44 | 4.5831 | 0.175 |
| 44(L3) | 15(R5) | 2.93 | 5.4942 | 0.185 |
| 44(L3) | 13(R6) | 3.38 | 6.3932 | 0.321 |
| 44(L3) | 11(R7) | 4.00 | 7.416 | 0.226 |

An Example of Trained Traveled Distance for all Gear Ratios for One Bicycle

For multi-gears, several speed models and traveled distance models at certain gear ratios are trained by the method discussed above. The number of trained models during MG-CDR training phase will not cover all gear ratios most of the time, as this depends which gears the cyclist used during GNSS availability. During the start of utilization phase, i.e. during GNSS outages, the average s of a history buffer of traveled distance (for the last good period of GNSS velocity availability before the outage) is used to choose a CDR model. This model can be directly one of the trained models during GNSS availability or can be an interpolated/extrapolated model, as detailed below. At that point the actual current gear ratio is unknown. Given this new s, the proposed system automatically tries to match the nearest $\hat{s}_j$.

If the match is near enough, then the corresponding speed model and traveled distance model are retrieved. If a similar value doesn't exist, interpolation or extrapolation will be used to calculate parameters a and b for the speed model, and $\hat{s}_j$ will be used for traveled distance. For example, given that s is nearest to $\hat{s}_3$ which does not have a nearby existing CDR models and there exist two trained CDR models with distance traveled $\hat{s}_1$ and $\hat{s}_2$ respectively, then the new speed model is calculated by the interpolation equations:

$$a_3 = \frac{a_2 - a_1}{\hat{s}_2 - \hat{s}_1} \times (\hat{s}_3 - \hat{s}_1) + a_1 \quad (6)$$

$$b_3 = \frac{b_2 - b_1}{\hat{s}_2 - \hat{s}_1} \times (\hat{s}_3 - \hat{s}_1) + b_1 \quad (7)$$

Figure 21:
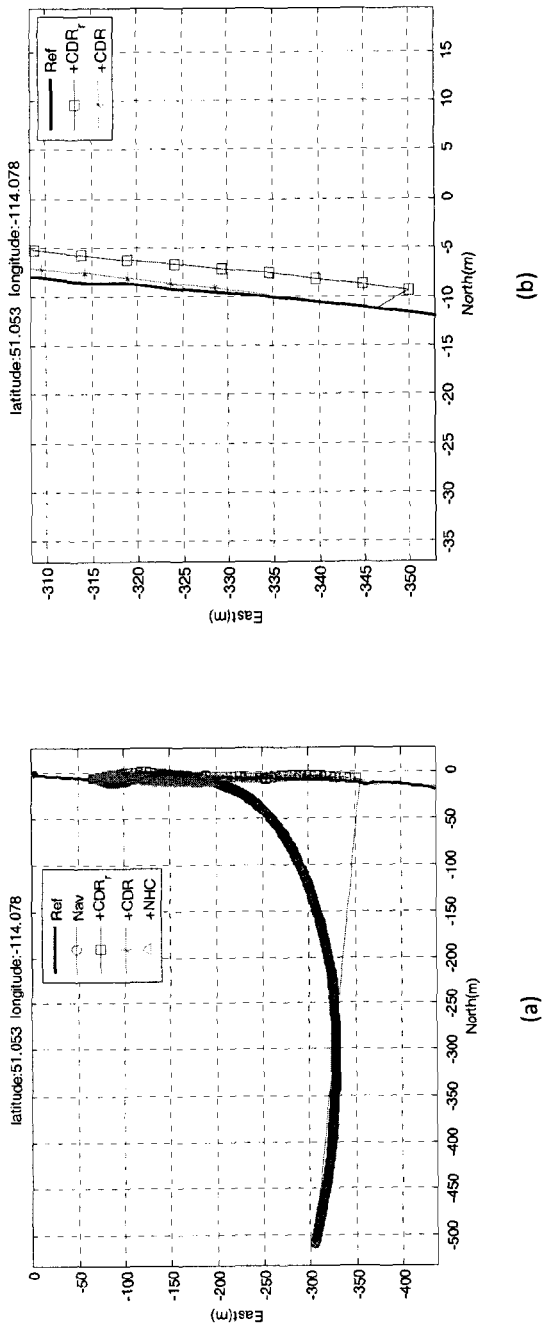
Figure 22:
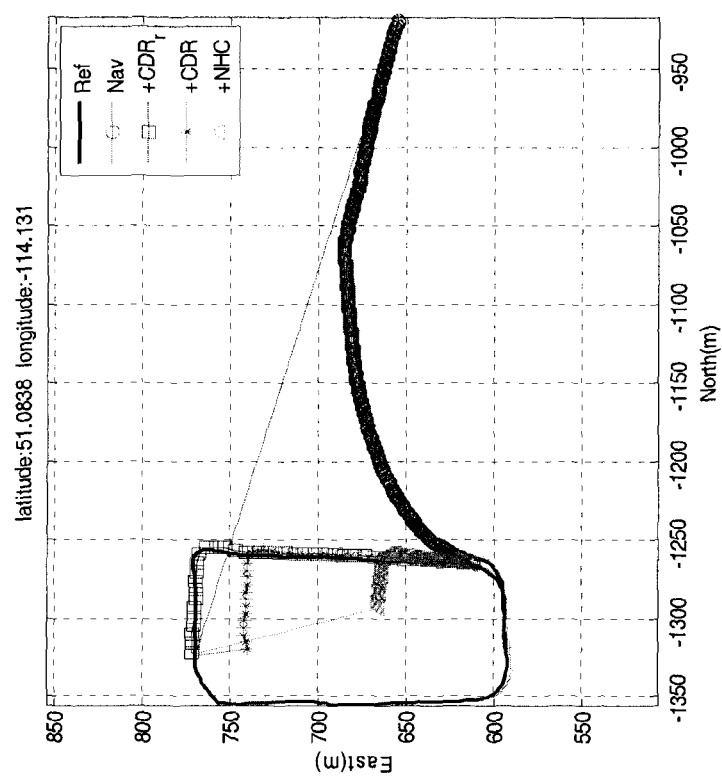
FIG. 22 Outage 2: Performance with 1 minute simulated (Cyclist 2, bicycle B)
Figure 23:
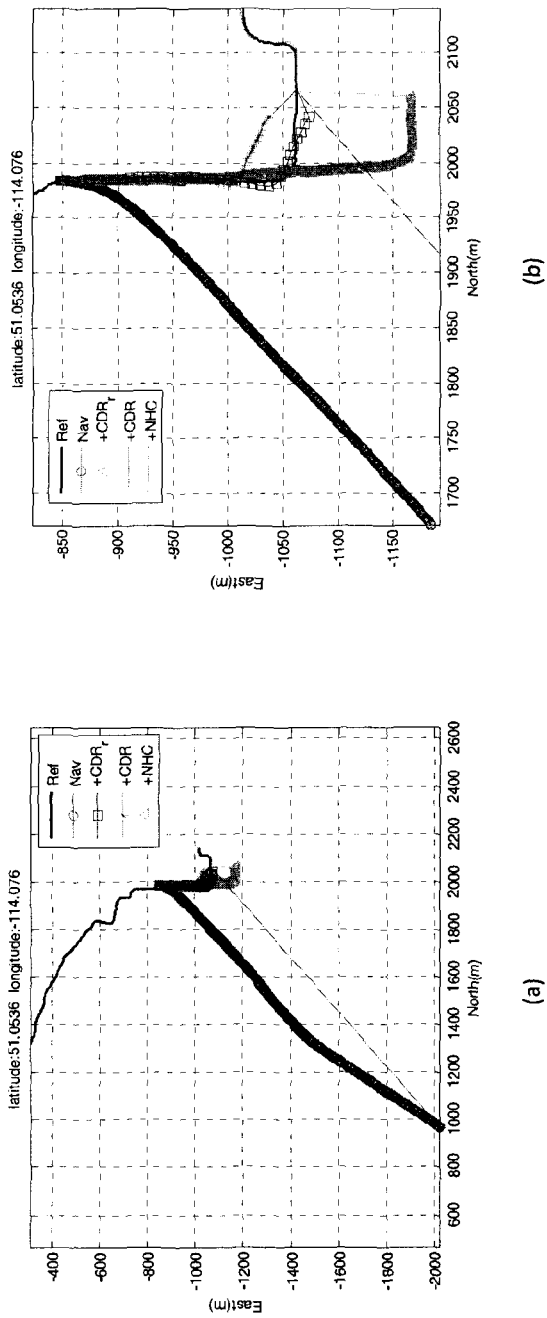
FIG. 23 Outage 3: (a) Performance with 1 minute simulated (Cyclist 3, bicycle C) (b) Zoom in part of Outage 3
Figure 24:
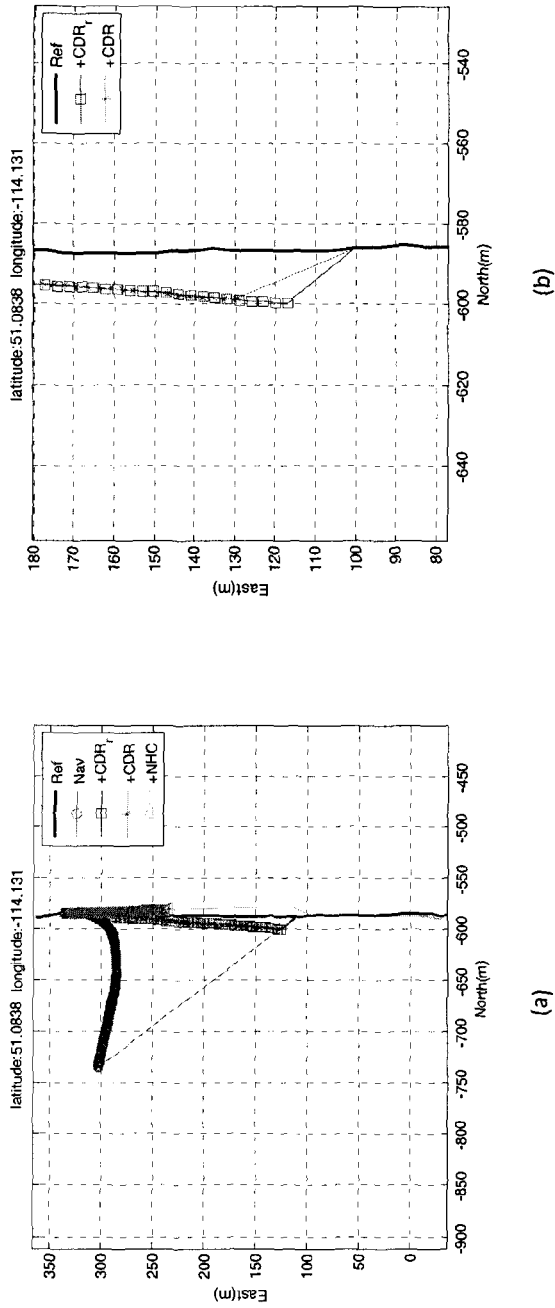
FIG. 24 Outage 4: (a) Performance with 1 minute simulated (Cyclist 4, bicycle D) (b) Zoom in part of Outage 4

The road test trajectories were in Calgary, Alberta, Canada. Some of the trajectories were performed for more than 10 loops. In order to evaluate the performance of low-cost GNSS/MEMS inertial integration, the simulated GNSS outage was applied to test the proposed system's accuracy. Each of the trajectories has intentionally introduced GNSS signal blockage in postprocessing. FIG. 21 shows the solutions with one minute simulated GNSS outage collected by cyclist 1 using bicycle A. The line with circular markers shows the navigation solution without NHC and without CDR. The line with upward facing triangle markers shows the navigation solution with WIC and without CDR. The line with square markers shows the navigation solution with CDR The line star markers shows the solution aided by an intentionally wrong MG-CDR model. The reason of adding an intentionally wrong MG-CDR model is to demonstrate that a wrong model is better than using no models with or without NHC. The black line is the reference which is a backward smoothed navigation solution with no simulated GNSS outage. As shown in this figure, MG-CDR can effectively reduce position errors. In order to verify, the proposed scheme can work on different bicycles with different gear ratios and different cyclists, FIGS. 22-24 show the results from the other three cyclists (2-4) with three bicycles (B-D) respectively. Table 4 summaries the maximum position error these field tests reached where NAV means the real-time integrated navigation solution. Overall, NHC can effectively reduce position error on lateral direction but cannot reach better position estimation on forward direction. Because no effective velocity information is fed to NHC, underestimated speed can be found in FIG. 21-24. Factors that control the performance of NHC include the speed while GNSS is lost, the accuracy of the transformation between b-frame and v-frame, and the shape of the trajectory. As shown in the FIGS. 21 to 24 and Table 4, the performance of MG-CDR is much better than traditional solutions.

TABLE 4

Maximum Position Error of MG-CDR and Traditional Solutions

| Maximum horizontal error (m) | Outage 1 | Outage 2 | Outage 3 | Outage 4 |
|---|---|---|---|---|
| Original | 501.21 | 422.75 | 1458.83 | 124.17 |
| NHC | 136.00 | 108.72 | 105.12 | 143.96 |
| MG-CDR without correct model | 18.01 | 29.65 | 38.29 | 24.14 |
| MG-CDR with correct model | 4.20 | 5.04 | 22.67 | 15.34 |

Heading Misalignment Angle Estimation

For user convenience, the device is a portable navigation device that can be installed in any location or orientation such as thigh, leg, belt or arm. Due to the different location of the device, the device heading is different from the bicycle's heading most of the time. Therefore, it is important to continuously track misalignment between b-frame and v-frame. Human motion in cycling involves lower limbs in periodical movement. One feature of lower limbs in pedaling is the fact that the acceleration or deceleration of motion plane is parallel to the wheel. Based on this feature, misalignment angle estimation in this example is implemented using PCA technique.

PCA technique is an ordination technique which involves the Eigen-analysis of the data matrix. The data matrix is composed by rows of x corresponding to observations, columns to variables. It will transform the acceleration measurements into a set of uncorrelated variables called principal components. Therefore, motion direction gains the highest score and becomes the first principal component. In another word, first principal component indicates the longitudinal direction of the bicycle (along-track direction).

Figure 25:
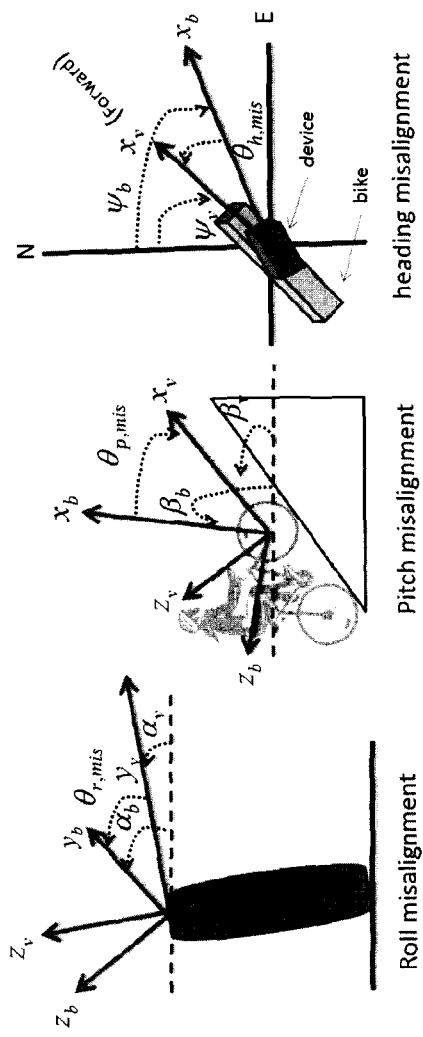
FIG. 25 shows a definition of roll misalignment, pitch misalignment, and heading misalignment.

FIG. 25 defines three different misalignments angles (i.e. in roll, pitch and heading). As shown in figure, the heading misalignment angle is estimated as the difference between the platform heading and the device heading as in Equation (6):

$$\theta_{h,mis} = \psi_v - \psi_b \quad (6)$$

The accelerations are leveled to the horizontal plane first using the roll and pitch values. In this example, they are estimated from a full GPS/INS integration system, but this is one possibility among others as mentioned earlier. Accelerometers sense not only gravity but also forward acceleration generated by a bicycle and tangential force along the pedal. In order to eliminate the effect caused by tangential acceleration in gravity direction, PCA is implemented using leveled acceleration measurements within one complete cycle. After PCA calculation, the angle estimated by first principal component is the along-track angle and may indicate either forward or backward directions (i.e. it has a 180 degrees ambiguity). The preliminary angle (along-track angle) is estimated by:

$$\theta_{h,mis} = \tan^{-1}\left(\frac{EV_y}{EV_x}\right) \quad (7)$$

Where EVx represents the first value in primary component, EVy represents the second value in primary component, $\theta_{h,mis}$ is the heading misalignment.

The next step is to rotate the x axis of the device into the longitudinal axis and compose a motion vector to check whether the direction is a forward direction or backward direction. Since the plane is already leveled to horizontal, the motion vector is composed by:

$$\begin{bmatrix} \text{motion\_vector} \\ \text{lateral\_vector} \end{bmatrix} = \begin{bmatrix} \cos(\theta_{h,mis}) & -\sin(\theta_{h,mis}) \\ \sin(\theta_{h,mis}) & \cos(\theta_{h,mis}) \end{bmatrix} \begin{bmatrix} x \\ y \end{bmatrix} \quad (8)$$

In order to solve 180 degree ambiguity, the technique in this example (for the sake of demonstration) will classify device location into three categories: (1) human trunk. (2) Thigh. (3) Leg. Once the classification is done, it triggers the corresponding technique to solve 180 degree ambiguity.

Figure 26:
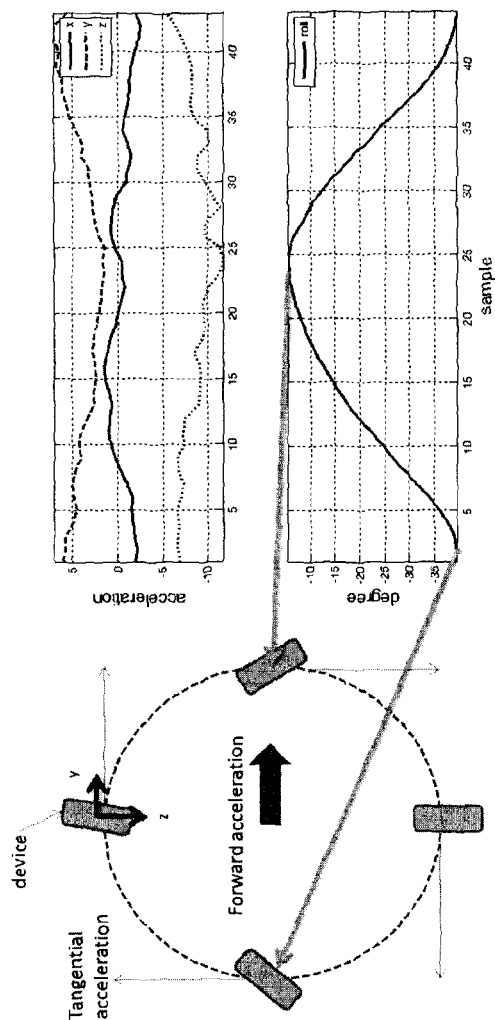
FIG. 26 shows the raw acceleration measurements and attitude signal (Leg).
Figure 27:
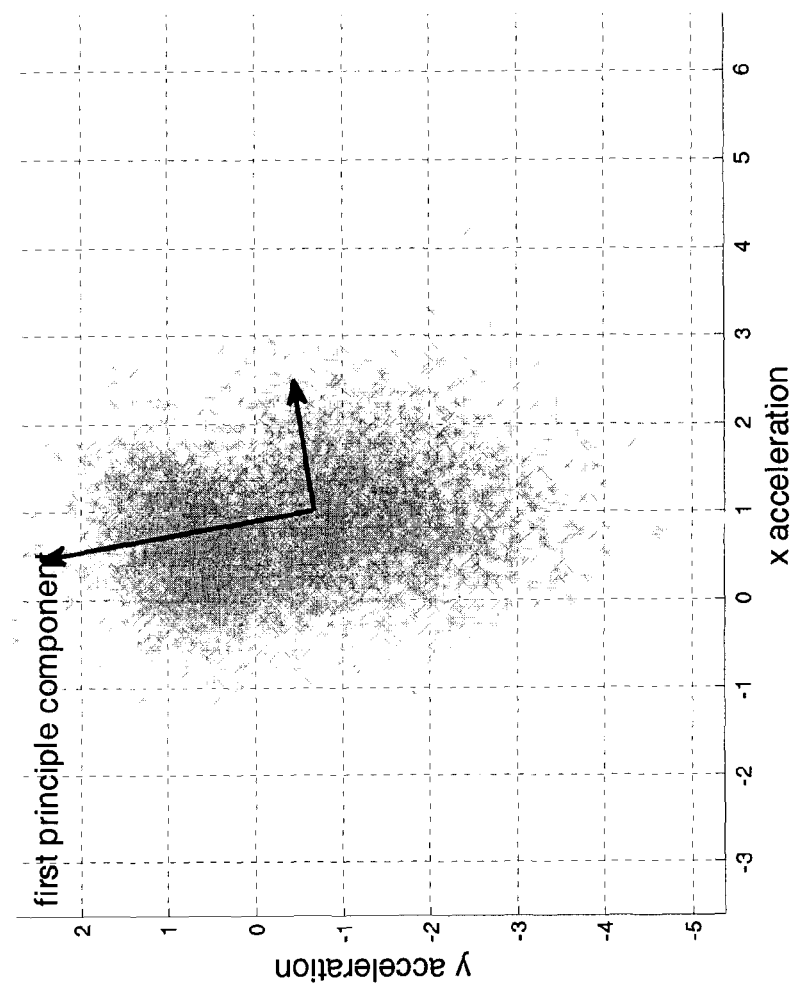
FIG. 27 shows the leveled acceleration cloud generated by device on leg.
Figure 28:
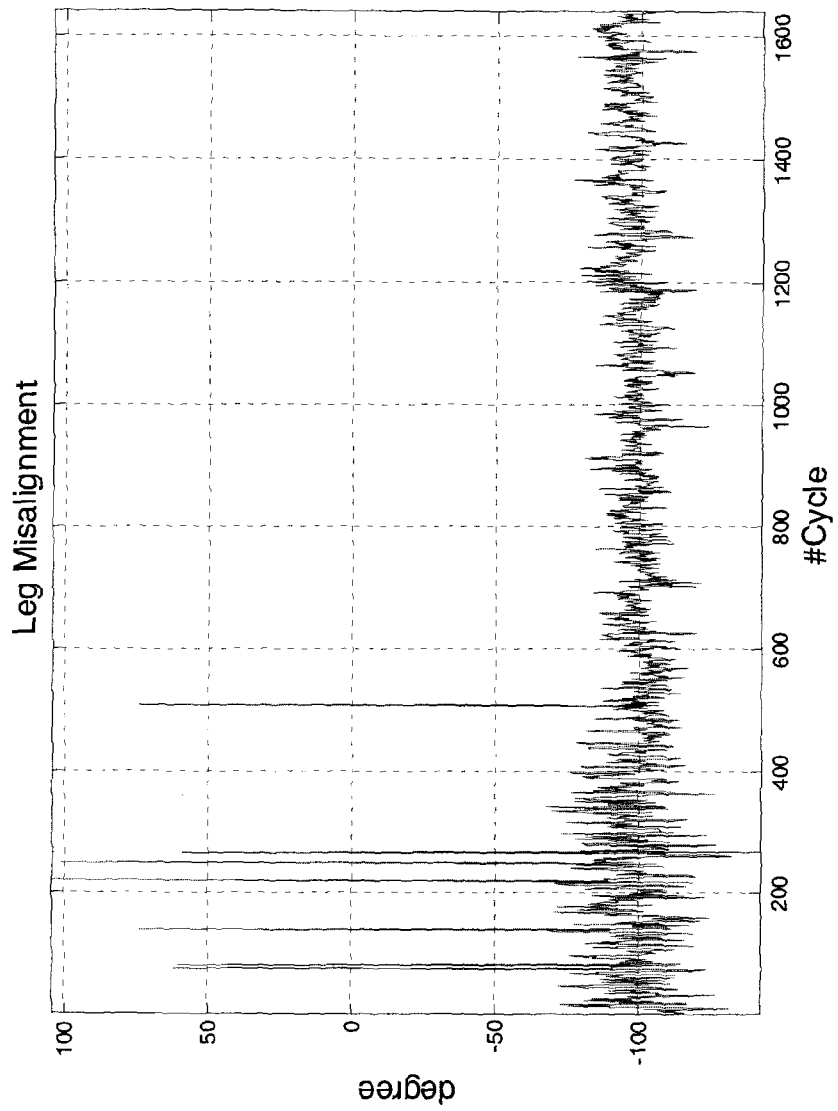
FIG. 28 shows the performance in estimating heading misalignment on the leg.

In case of the device moving with leg, the raw acceleration and attitude signal is shown in FIG. 26. Left part describes how device moves along with a cycle while device orientation varying according to the knee's angle. The right side part shows the corresponding raw accelerations and attitude changes. In this case, device axes are re-defined so that the z axis is vertical down, y axis points at forward direction and x axis points at lateral direction. It shows acceleration on x axis increase while pedal close to 180 degree phase (lower limb stretching). Based on this phenomenon, if the motion vector is coincident with forward direction, the slope in motion signal is opposite to the slope of vertical signal axis. If the slope has same sign, the preliminary misalignment needs to add on 180 degree. FIG. 27 shows part of the horizontal accelerations clouds generated on leg and the corresponding average direction of first principle component vector. FIG. 28 shows the performance in estimating heading misalignment on the leg. While the forward speed is below 3 meter per second, the opportunity in wrong direction increases.

Figure 29:
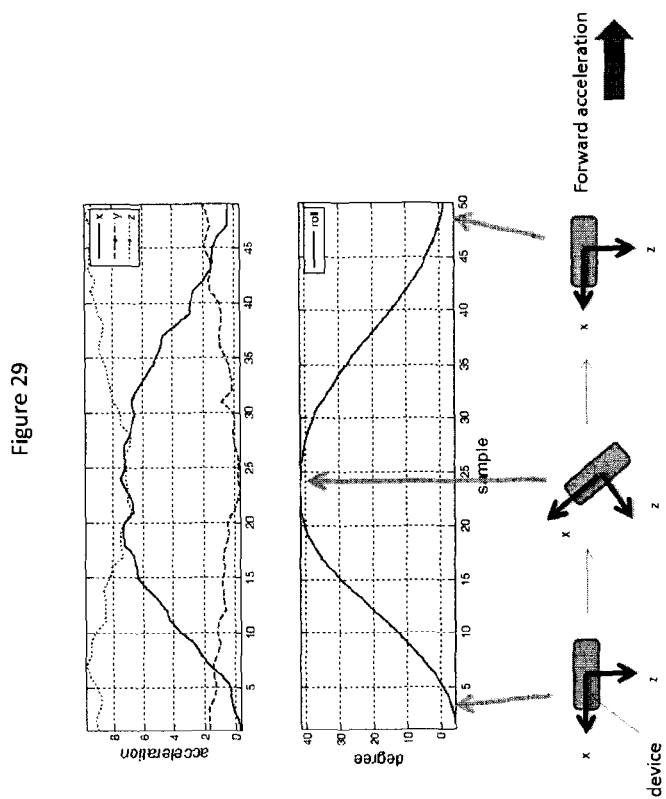
FIG. 29 the raw acceleration measurements and attitude signal (thigh).
Figure 30:
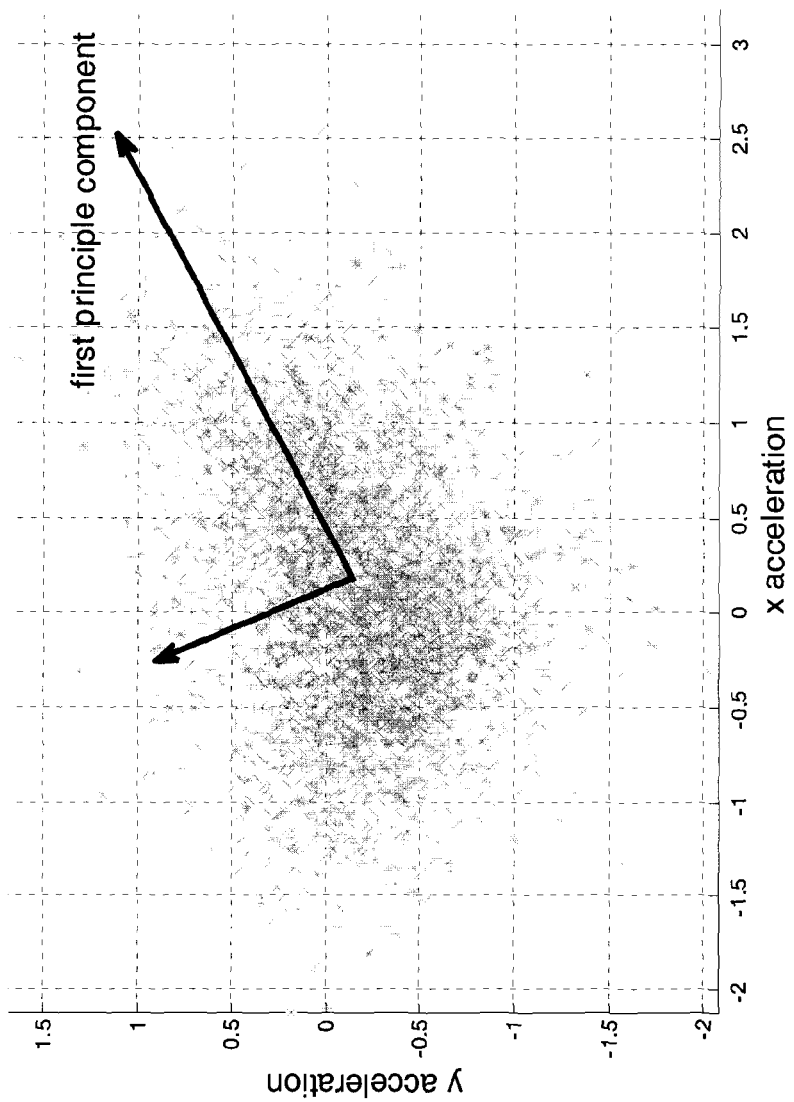
FIG. 30 shows the leveled accelerations clouds generated by device on thigh.
Figure 31:
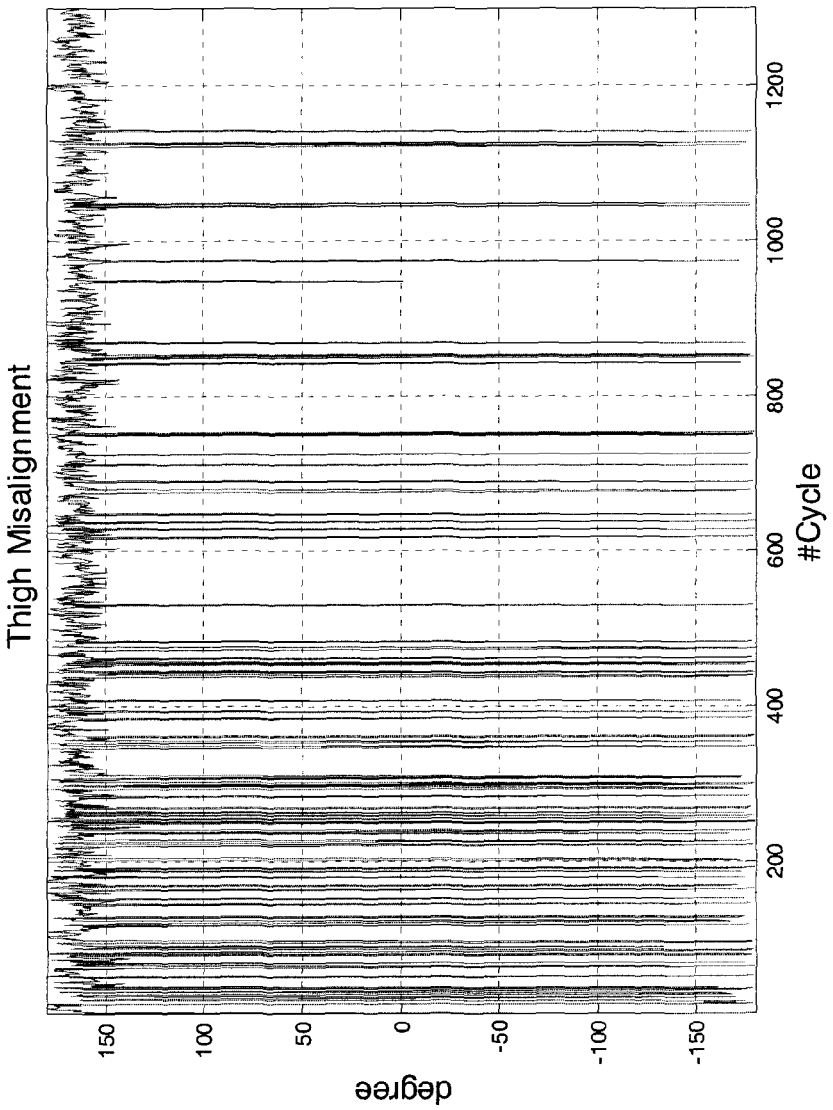
FIG. 31 shows the performance in estimating heading misalignment on the thigh.
Figure 32:
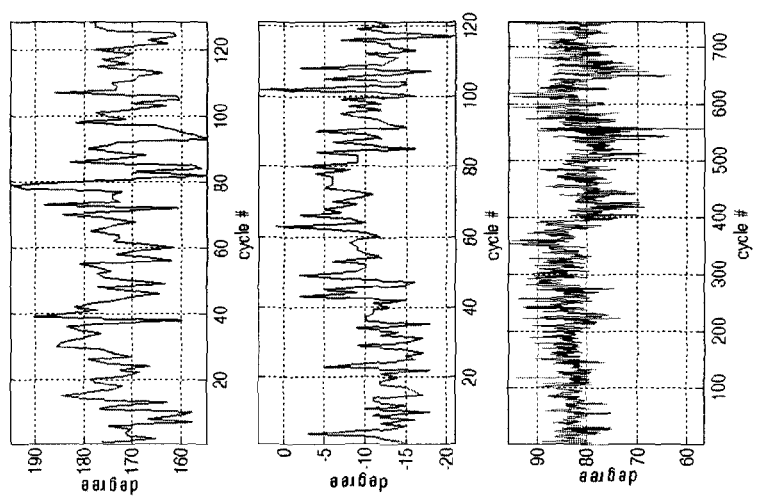
FIG. 32 shows examples of heading misalignments. (a) Backpack. (b) Right pocket. (c) Lower leg

In case of the device moving with thigh, the raw acceleration and attitude signal is shown in FIG. 29. While the device is detected to be mounted on the thigh, instead of doing circular motion, it actually works up and down. This is described in FIG. 29 at the bottom. Therefore, if the technique detected acceleration had up and down motion instead of circular motion, it uses PCA to detect misalignment based on part of accelerations. FIG. 30 shows part of the horizontal accelerations clouds generated on thigh and the corresponding average direction of first principle component vector. FIG. 31 shows the performance in estimating heading misalignment on the leg. In this case, the device is placed with the z axis vertical down, the x axis in the backward direction and the y axis in the lateral direction. Therefore, the expected direction should close to 180 degrees. The method to estimate misalignment on thigh uses leveled acceleration when the pedal moves from phase 270 degrees to phase 90 degrees. It is based on the fact that the thigh gives the device bigger forward acceleration to move the pedal around during this angle period. Therefore, the first principal component coincides with motion direction concisely. In some cases while forward motion signal derived by acceleration is not stable, the optional technique is used which is based on the PCA of leveled gyroscope reading. The axis that is closest to the lateral direction has a larger variation due to the thigh's up and down motion. Therefore the forward/backward direction is estimated by adding 90 degree on the PCA result. Next step is to calculate ambiguity based on the correlation between vertical acceleration and forward angular angle (rotated from leveled angular rate on the x-axis and y-axis of gyroscope's reading by PCA major angle). If the vertical acceleration has more than 100 degree shift to forward angular angle (equal to platform's pitch), this is backward direction. FIG. 32 shows three results from the heading misalignment group. FIG. 32(a) shows the results when the device was located in a backpack with the x-axis pointing near down and the z-axis pointing in a near forward direction. The expected value is approximately 180 degrees. The mean value for this test is about 170 degrees; the difference reflects the small movement of the device within the backpack. FIG. 32(b) shows the results when the device was located in the right pocket with the x-axis toward forward direction and the z-axis pointing to the thigh. The expected value is approximately 0 degrees. The mean value for this test is about −10 degrees, which is close to the expected value and is more correct then the rough expected value. Finally, FIG. 32(c) describes the situation when the device was located on the lower left leg with the x-axis pointing up and the y-axis pointing forward. The expected value is roughly 90 degrees. The mean value for this test is about 80 degrees, which is very close to the expected value.

Pitch Misalignment Angle Estimation

As described above, a cyclist can change their trunk's angle while climbing a slope or a descent. Therefore, it is important to estimate pitch misalignment properly before implementing NHC on bicycle's navigation solution. One possible method to estimate pitch misalignment is based on the acceleration or deceleration presented on the motion direction while climbing up or sliding down. The method to estimate pitch misalignment between body frame and bicycle frame is based on second PCA implementation. Assume heading misalignment is accurate, and then the raw measurements are rotated to the same sagittal plane (which is vertical to the ground and goes through the center line of bicycle). The second PCA implementation is then applied on the accelerations distributed on the sagittal plane. Another method is based on calculating the pitch angle from velocity whether from the integrated solution or from GPS when available. It is calculated from the arctangent of vertical component of velocity from either GPS or integrated solution and the forward horizontal component of velocity generated either by GPS or integrated solution. The alternative method of pitch misalignment will be used if the above method is not working. As depicted in FIG. 25, $\beta_v(t)$ can be calculated by the arctangent function if the height difference (dv) and horizontal difference (dh) can be derived. This can be achieved by using the barometer to get dv and GNSS to get dh. The derived value represents the pitch angle of the bicycle, and therefore, the pitch misalignment is derived by:

$$\theta_{p,mis} = \beta_b(t) - \beta_v(t) \quad (9)$$

Figure 33:
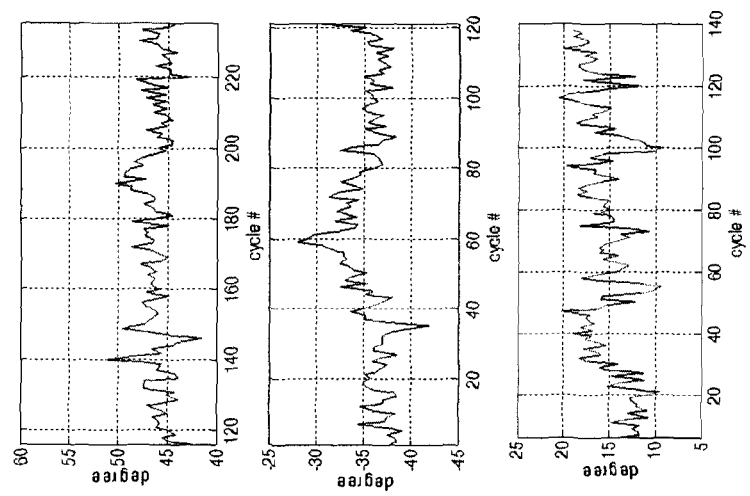
FIG. 33 shows examples of pitch misalignments. (a) Lower leg (45). (b) Lower leg (−45). (c) Lower leg (0)

FIG. 33 shows three results from the pitch misalignment group. FIG. 33(a) shows the results when the device was located on the lower right leg with the x-axis pointing slightly 45 degrees forward and the z-axis pointing to the leg. The expected value is approximately 45 degrees. The mean value for this test is about 45 degrees, which is exactly the expected value. FIG. 33(b) shows the results when the device was located on lower right leg with the x-axis pointing −45 degrees forward and the z-axis pointing to the leg. The expected value is approximately −45 degrees. The mean value for this test is about −35 degrees, which close to the expected value. The final example is shown in FIG. 33(c) where the device is put roughly horizontal onto the lower leg with the x-axis pointing backward. The average of the pitch misalignment is 15 degrees, which is close to the real scenario.

Roll Misalignment Angle Estimation

Figure 34:
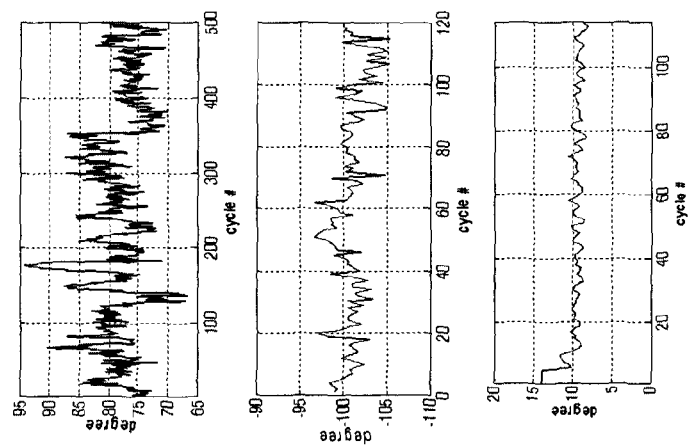
FIG. 34 shows examples of roll misalignments. (a) Lower leg. (b) Right pocket. (c) On bicycle

One possible technique of obtaining the roll misalignment is described in this example. Typically, the wheel is vertical to the ground unless the speed reaches minimal balance threshold to perform lean angle inward the turning radius. Therefore, the initial roll angle in v-frame is always close to zero. The roll angle in b-frame is calculated on the device by one several possible techniques as discussed earlier. These angles are shown in FIG. 34. As mentioned above, the roll misalignment value is near constant (i.e. it will not change with the leaning) because a cyclist will always try to maintain body lean with the bicycle nearly at same level. So when straight motion of bicycle is detected (where the roll angle of the bicycle is near zero), the roll of the device at that time is nearly the mean value of the roll misalignment. As described this misalignment value will not change much during the ride and will nearly always be around the same value which depends on the device position. FIG. 34 shows three results from the roll misalignment group. FIG. 34(a) shows the results when the device was located on the lower left leg with the x-axis pointing up and the y-axis pointing forward. The expected value is roughly around 90 degrees. The mean value for this test is about 80 degrees, which is very close to the expected value and more correct than the rough expected value. FIG. 34(b) shows the results when the device was located in the right pocket with the x-axis pointing to the left side of body and the z-axis facing the thigh. The expected value is roughly around negative 90 degrees. The mean value for this test is about negative 100 degrees, which is very close to the expected value and more correct than the rough expected value. The final example is shown in FIG. 34(c) where the device is fixed onto the bicycle with the x-axis pointing forward direction and the z-axis pointing up to the ground.

C_bv Matrix Utilization

GPS/INS mechanization involves a transformation matrix of C_bn to decouple the earth rotation component and gravitational force from the raw measurements before integrating acceleration and angular rate to estimate position and velocity. This matrix can be expressed in form of Euler angles which includes roll ($\alpha$), pitch ($\beta$) and heading ($\psi$). The matrix C_bn usually comes from the alignment process and continuously adapted by gyroscope reading.

NHC is a very practical theory in improving the navigation parameter accuracy especially when GPS outages occur. This theory assumes a platform cannot move sideways or vertically which means the velocity component in y axis (sideways of the platform) and z axis (vertical perpendicular on the plane of motion of the platform) are zero. However, before applying NHC which is a constraint on the platform frame, velocity from the solution has to be converted into a platform frame which is bicycle frame in this case.

Since the device is designed to be carried by the user, C_bv can change by different motion of the device. Transformation matrix C_bv involves the estimation procedure to determine the relationship between b-frame and v-frame. Each of them defines the angle difference from b-frame to v-frame. The C_bv matrix consists of roll misalignment ($\theta_{r,mis}=\alpha_v-\alpha_b$), pitch misalignment ($\theta_{p,mis}=\beta_v-\beta_b$) and heading misalignment ($\theta_{h,mis}=\psi_v-\psi_b$).

FIG. 25 describes these three different kind of misalignments. For sharp turning, the cyclist leans to the inside of the curve. The greater the speed, the greater the lean it should be. Consequently, roll of the bicycle becomes significant in this case. However, the roll misalignment value should still be close to constant (i.e. it will not change with the leaning) because a cyclist will always try to maintain body lean with the bicycle nearly at same level. While riding up or down the road, the cyclist leans forward or backward to reduce wind friction or other factors, therefore, the pitch misalignment becomes significant. Compared to the previous misalignment, heading misalignment is the most critical angle because it happens most frequently. Another important reason for continuously modifying misalignment between sensor's frame and platform's frame is because it is necessary information before applying NHC on bicycle's navigation solution.

Figure 35:
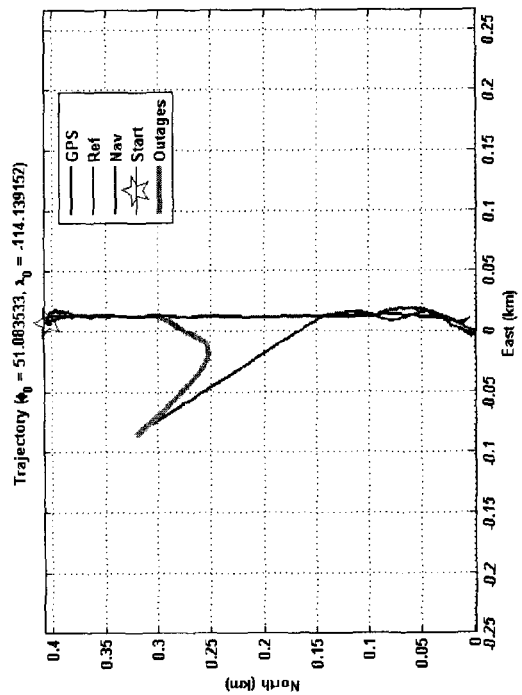
FIG. 35 shows trajectory with 60 seconds GPS outage and traditional solutions
Figure 36:
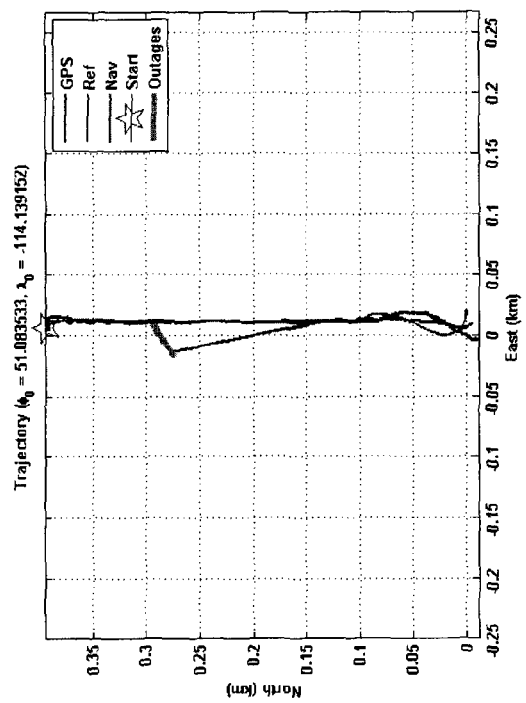
FIG. 36 shows trajectory with 60 seconds GPS outage and NHC
Figure 37:
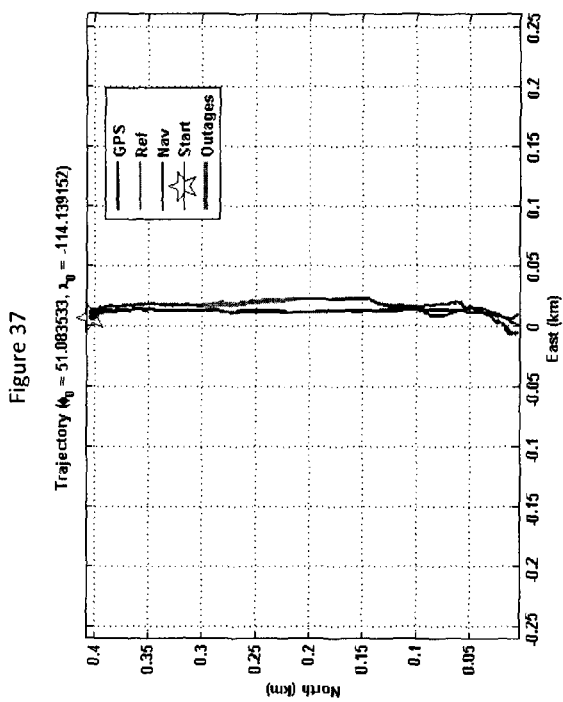
FIG. 37 shows trajectory with 60 seconds GPS outage and NHC with estimated 3D misalignments
Figure 38:
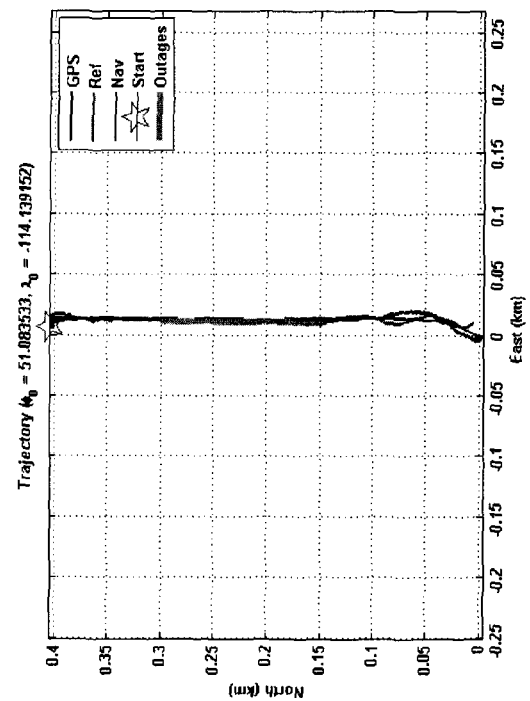
FIG. 38 shows trajectory with 60 seconds GPS outage and CDR with estimated 3D misalignments

FIGS. 35 to 38 demonstrate that the proposed methods can estimate 3D misalignments between the b-frame and v-frame. This further demonstrates that the device may be used in any orientation with respect to the bicycle. In addition, the methods can improve the navigation solution by incorporating NHC and/or CDR, which significantly reduces the position error, especially in GNSS-denied environments. In order to evaluate the effectiveness of 3D misalignments in position domains, several experiments with simulated GNSS outages were conducted. The results are consistent for all outages. One simulated outage is discussed here as an example. As shown in FIG. 35, if the subject uses a smartphone as a navigator and experiences a 60-second GNSS outage, the horizontal position errors can reach 198.55 meters without using NHC. FIG. 36 shows if we use NHC but without $C_b^v$ to update velocity in EKF, the horizontal position error can still reach 127.02 meters. FIG. 37 shows the results while applying NHC with estimated $C_b^v$ (−77 degree in roll, 11 degree in pitch, and 90 degree in heading), the horizontal position error can reduce to 72.53 meters. Finally, FIG. 38 shows the results with the CDR technique and estimated $C_b^v$, the error effectively reduces to 6.38 meters. This demonstrates how important it is to estimate $C_b^v$ for portable devices. The final position errors are summarized in Table 5.

TABLE 5

| Maximum horizontal error (m) | North error (m) | East error (m) | Horizontal error (m) |
| --- | --- | --- | --- |
| Without NHC | 173.4 | 96.71 | 198.55 |
| NHC without $C_b^v$ | 119.4 | −43.32 | 127.02 |
| NHC with $C_b^v$ | 71.98 | 9.18 | 72.53 |
| CDR with $C_b^v$ | −5.29 | −3.57 | 6.38 |

Maximum Position Error of CDR, NHC with 3D Misalignments, and Traditional Solutions The embodiments and techniques described above may be implemented as a system or plurality of systems working in conjunction, or in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processor enabled devices in communication with the device, such as a server or other devices.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for providing an enhanced navigation solution related to at least one device and a cycling platform that moves through pedal cycles, wherein the at least one device is positionable in any orientation with respect to the platform, and the device is locatable at any location on the cycling platform or on a body of a cyclist of the cycling platform, and wherein the at least one device comprises sensors capable of providing sensor readings, the method comprising detecting the pedaling cycles using the sensor readings to provide the enhanced navigation solution, wherein providing the enhanced navigation solution further includes at least one of:

i) obtaining models for speed of the platform, traversed distance of the platform, or both the speed of the platform and the traversed distance of the platform and applying the obtained models together with a platform heading to obtain a cycling dead reckoning solution comprising position of the platform, velocity of the platform, or both position and velocity of the platform; and ii) determining a heading misalignment between the at least one device and the cycling platform.

2. The method of claim 1, comprising providing the enhanced navigation solution by:

obtaining models for speed of the platform, traversed distance of the platform, or both the speed of the platform and the traversed distance of the platform and applying the obtained models together with a platform heading to obtain a cycling dead reckoning solution comprising position of the platform, velocity of the platform, or both position and velocity of the platform.

3. The method of claim 1, comprising providing the enhanced navigation solution by determining a heading misalignment between the at least one device and the cycling platform.

4. The method of claim 1, comprising providing the enhanced navigation solution by:

a) determining a heading misalignment between the at least one device and the platform;

b) obtaining models for speed of the platform, the traversed distance of the platform, or both the speed of the platform and the traversed distance of the platform;

c) using the heading misalignment together with the at least one device heading to calculate a platform heading; and d) applying the obtained models together with the platform heading to obtain a cycling dead reckoning solution comprising position of the platform, velocity of the platform, or both position and velocity of the platform.

5. The method of any one of claim 3 or 4, wherein the method further comprises using the heading misalignment to enhance the navigation solution by applying motion constraints on the solution.

6. The method of any one of claim 1, 2, 3, 4, or 5, wherein the method further comprises determining a pitch misalignment between the at least one device and the platform.

7. The method of any one of claim 1, 2, 3, 4, 5, or 6, wherein the method further comprises determining a roll misalignment between the at least one device and the platform.

8. The method of claim 3 or 4, wherein the method further comprises determining a pitch misalignment between the at least one device and the platform, determining a roll misalignment between the at least one device and the platform, and using the heading misalignment, the pitch misalignment, and the roll misalignment to enhance the navigation solution by applying motion constraints on the solution.

9. The method of claim 2, wherein the method further comprises determining a heading misalignment between the at least one device and the platform, determining a pitch misalignment between the at least one device and the platform, determining a roll misalignment between the at least one device and the platform, and using the heading misalignment, the pitch misalignment, and the roll misalignment to enhance the navigation solution by applying motion constraints on the solution.

10. The method of claim 2, wherein the method further comprises determining a heading misalignment between the at least one device and the platform, determining a pitch misalignment between the at least one device and the platform, determining a roll misalignment between the at least one device and the platform, and using the heading misalignment, the pitch misalignment, and the roll misalignment to enhance the navigation solution by applying velocity updates from the speed obtained from cycling dead reckoning.

11. The method of claim 4, wherein the method further comprises determining a pitch misalignment between the at least one device and the platform, determining a roll misalignment between the at least one device and the platform, and using the heading misalignment, the pitch misalignment, and the roll misalignment to enhance the navigation solution by applying velocity update derived from the speed obtained from cycling dead reckoning.

12. The method of any one of claim 2, 4, 10, or 11, wherein the method further comprises using the position from cycling dead reckoning to enhance the navigation solution by applying said position from cycling dead reckoning as position update.

13. The method of any one of claim 2, 4, 10, or 11, wherein the method further comprises using the position from cycling dead reckoning as the position output of the navigation solution.

14. The method of any one of claim 2, 4, 10, 11, 12, or 13, wherein the cycling dead reckoning works with platforms with multiple gear pedaling system.

15. The method of any one of claim 2, 4, 10, 11, 12, or 13, wherein the cycling dead reckoning works with platforms with single gear pedaling system.

16. The method of any one of claim 2, 4, 10, 11, 12, or 13, wherein the cycling dead reckoning works with platforms with pedaling system without gears.

17. A system for or providing an enhanced navigation solution for a cycling platform, comprising at least one device within the cycling platform, the cycling platform moveable through pedal cycles, wherein the device is positionable in any orientation with respect to the platform, wherein the device is locatable at any location on a body of a cyclist of the cycling platform, the device comprising:

a) an assembly of sensors capable of providing sensor readings b) a receiver for receiving absolute navigational information about the device from an external source, and producing an absolute navigational information output; and c) a processor, coupled to receive the sensor readings and the absolute navigational information output, and operative to detect the pedaling cycles to provide the enhanced navigation solution, wherein the processor is further operative to provide the enhanced navigation solution by at least one of:

i) obtaining models for speed of the platform, traversed distance of the platform, or both the speed of the platform and the traversed distance of the platform and applying the obtained models together with a platform heading to obtain a cycling dead reckoning solution comprising position of the platform, velocity of the platform, or both position and velocity of the platform; and ii) determining a heading misalignment between the at least one device and the cycling platform.

18. The system of claim 17, wherein the processor is operative to to provide the enhanced navigation solution by obtaining models for speed of the platform, the traversed distance of the platform, or both the speed of the platform and the traversed distance of the platform and applying the obtained models together with a platform heading to obtain a cycling dead reckoning solution comprising position of the platform, velocity of the platform, or both position and velocity of the platform.

19. The system of claim 17, wherein the processor is operative to provide the enhanced navigation solution by determining a heading misalignment between the at least one device and the platform.

20. The system of claim 17, wherein the processor is operative to provide the enhanced navigation solution by:
   a) determining a heading misalignment between the at least one device and the platform;
   b) obtaining models for speed of the platform, the traversed distance of the platform, or both the speed of the platform and the traversed distance of the platform;
   c) using the heading misalignment together with the at least one device heading to calculate a platform heading; and
   d) applying the obtained models together with the platform heading to obtain a cycling dead reckoning solution comprising position of the platform, velocity of the platform, or both position and velocity of the platform.

* * * * *